United States Patent
Yata

(10) Patent No.: US 8,212,954 B2
(45) Date of Patent: Jul. 3, 2012

(54) LIQUID CRYSTAL DISPLAY DEVICE

(75) Inventor: Tatsuya Yata, Ogaki (JP)

(73) Assignee: Sony Corporation, Tokyo (JP)

( * ) Notice: Subject to any disclaimer, the term of this patent is extended or adjusted under 35 U.S.C. 154(b) by 599 days.

(21) Appl. No.: 12/208,810

(22) Filed: Sep. 11, 2008

(65) Prior Publication Data

US 2009/0128727 A1    May 21, 2009

(30) Foreign Application Priority Data

| Nov. 21, 2007 | (JP) | ................................. | 2007-301300 |
| Nov. 21, 2007 | (JP) | ................................. | 2007-301301 |

(51) Int. Cl.
*G02F 1/136* (2006.01)
*G02F 1/1343* (2006.01)

(52) U.S. Cl. .......................................... 349/46; 349/139

(58) Field of Classification Search ................. 349/46, 349/139, 141, 143
See application file for complete search history.

(56) References Cited

U.S. PATENT DOCUMENTS

| 6,721,027 | B2 * | 4/2004 | Chuang | .......................... | 349/141 |
| 7,062,396 | B2 * | 6/2006 | Ogawa | ............................ | 702/85 |
| 7,352,425 | B2 | 4/2008 | Ono et al. | | |
| 7,486,345 | B2 | 2/2009 | Ono et al. | | |
| 7,612,855 | B2 | 11/2009 | Ono et al. | | |
| 7,710,526 | B2 * | 5/2010 | Kim et al. | ..................... | 349/143 |
| 2005/0105032 | A1 * | 5/2005 | Ono et al. | ..................... | 349/139 |
| 2007/0153204 | A1 | 7/2007 | Kim et al. | | |
| 2008/0171427 | A1 * | 7/2008 | Lojek | ............................ | 438/585 |
| 2008/0180624 | A1 * | 7/2008 | Choi et al. | .................... | 349/141 |

FOREIGN PATENT DOCUMENTS

| JP | A-2002-182230 | 6/2002 |
| JP | A-2005-148602 | 6/2005 |
| JP | A-2006-350168 | 12/2006 |
| JP | A-2007-183628 | 7/2007 |

* cited by examiner

*Primary Examiner* — Mark Robinson
*Assistant Examiner* — Robert Tavlykaev
(74) *Attorney, Agent, or Firm* — K&L Gates LLP

(57) ABSTRACT

A liquid crystal display device is provided that includes a plurality of pixels that forms a display unit. Each of the pixels includes at least a pair of substrates that is arranged opposite each other with a liquid crystal layer disposed therebetween; and a common electrode and a pixel electrode that are disposed on one substrate of the pair of substrates with an insulating film disposed therebetween so as to drive liquid crystal molecules of the liquid crystal layer. An electrode of the common electrode and the pixel electrode that is disposed closer to the liquid crystal layer has a slit having a predetermined tilt angle with respect to a longitudinal direction of each of the pixels and opposite outer edges that are in parallel to the slit.

7 Claims, 19 Drawing Sheets

LIQUID CRYSTAL DISPLAY DEVICE

CROSS REFERENCES TO RELATED APPLICATIONS

The present invention contains subject matter related to Japanese Patent Application Nos. 2007-301300 and 2007-301301 filed in the Japanese Patent Office on Nov. 21, 2007, the entire contents of which are incorporated herein by reference.

BACKGROUND

1. Technical Field

The present invention relates to a liquid crystal display device, and more particularly, to a liquid crystal device capable of improving transmittance characteristics.

2. Related Art

In the related art, as liquid crystal display devices capable of providing a high contrast ratio and a wide viewing angle, a liquid crystal display device is known in which the alignment of liquid crystal molecules is controlled by using an electric field generated in a direction approximately parallel to two transparent substrates having liquid crystals sandwiched therebetween. That is, a liquid crystal display device is known that is operated in a fringe-field switching (FFS) mode or an in-plain switching (IPS) mode. In such a liquid crystal display device, on one of the two transparent substrates, a pixel electrode to which a display signal is supplied and a common electrode to which a common potential is supplied are arranged.

In an liquid crystal display device that is operated in an FFS mode, a plurality of linear portions and a plurality of slits are arranged in the pixel electrode so as to alternate in parallel to each other, and the pixel electrode and the common electrode are disposed opposite each other with an insulating film disposed therebetween. The liquid crystal molecules are initially aligned in accordance with a rubbing direction of an alignment film. When the display signal is applied to the pixel electrode, an electric field that extends from the linear portions of the pixel electrode to the common electrode that extends on a lower layer of the slits is generated in a direction approximately parallel to the transparent substrate, and the alignment direction of the liquid crystal molecules is controlled in accordance with the electric field. An optical control is carried out via the liquid crystal molecules so that images are displayed as white or black.

For example, in Page 1 and FIG. 3 of JP-A-2002-182230, an FFS mode liquid crystal display device is disclosed, in which first and second transparent insulating substrates ate arranged opposite to each other at a predetermined distance, with a liquid crystal layer including a plurality of liquid crystal molecules interposed between them. A plurality of gate bus lines and a plurality of data bus lines are formed on the first transparent insulating substrate so as to be arranged in a matrix form to define a unit pixel. A thin film transistor is formed at intersections of the gate bus lines and the data bus lines. A counter electrode made of a transparent conductor is disposed in each unit pixel. A pixel electrode made of a transparent conductor is arranged in each unit pixel to generate a fringe field with the counter electrode so as to be isolated from the counter electrode, including a plurality of upper slits and a plurality of lower slits that are symmetrical each other with respect to longer sides of the pixel with a predetermined tilt angle.

In the FFS mode liquid crystal display device disclosed in JP-A-2002-182230, a rectangular pixel electrode is disposed at a region surrounded by the gate bus line and the data bus line. A plurality of slits that is inclined with respect to the shorter sides parallel to the gate bus line is formed in parallel to each other in the pixel electrode. The upper slits and the lower slits are formed such that the tilt angles thereof are symmetrical each other at a central position in the longitudinal direction of the pixel electrode. Therefore, it is possible to improve the transmittance by the slit configuration. However, since the pixel electrode has a rectangular shape and has slits that are inclined with respect to the shorter sides of the rectangle, an electrode portion having a rectangular equilateral triangular shape remains formed between the slits close to the opposite outer edges on the lower sides and a fringe of the pixel electrode. Therefore, the transmittance is lowered in the electrode portion.

SUMMARY

An advantage of some aspects of the invention is that it provides a liquid crystal display device capable of improving transmittance characteristics of an electrode in which slits are formed.

According to an aspect of the invention, there is provided a liquid crystal display device that includes a plurality of pixels that forms a display unit, in which each of the pixels includes at least a pair of substrates that is arranged opposite each other with a liquid crystal layer disposed therebetween; and a common electrode and a pixel electrode that are disposed on one substrate of the pair of substrates with an insulating film disposed therebetween so as to drive liquid crystal molecules of the liquid crystal layer, and in which an electrode of the common electrode and the pixel electrode that is disposed closer to the liquid crystal layer has a slit having a predetermined tilt angle with respect to a longitudinal direction of each of the pixels and opposite outer edges that are in parallel to the slit.

According to the configuration, since the electrode of the common electrode and the pixel electrode, in which the slit is formed, has opposite outer edges that are in parallel to the slit, the electrode can be formed in a generally parallelogram shape. Moreover, since the opposite outer edges that are in parallel to the slit do not have any unnecessary electrode portion, it is possible to improve the transmittance of the pixels.

In the liquid crystal display device according to the above aspect of the present invention, the slit may have a parallelogram shape and may be formed at a position inner than opposite outer edges in the longitudinal direction of the slit, of the electrode close to the liquid crystal layer.

According to the configuration, since the electrode close to the liquid crystal layer has a parallelogram shape, it is easy to form an exposure mask used during etching of a thin film of an electrode layer in order to form the electrode.

In the liquid crystal display device according to the above aspect of the present invention, the slit may extend to one of the opposite outer edges in the longitudinal direction of the slit, of the electrode close to the liquid crystal layer and the electrode may have a comb-teeth shape.

According to the configuration, since one end of the slit extends to one of the opposite outer edges in the longitudinal direction of the slit, of the electrode close to the liquid crystal layer and the electrode has a comb-teeth shape, it is possible to further improve the transmittance compared with the case where the electrode is formed in a parallelogram shape.

In the liquid crystal display device according to the above aspect of the present invention, a plurality of the slits may be formed in parallel to each other in the electrode close to the liquid crystal layer.

According to the configuration, since a plurality of the slits is formed in parallel to each other, it is possible to improve the transmittance of the pixels.

In the liquid crystal display device according to the above aspect of the present invention, the electrode close to the liquid crystal layer may be formed such that an outer electrode portion thereof does not overlap with a gate line.

According to the configuration, since the outer electrode portion of the electrode close the liquid crystal layer does not overlap with the gate line, the liquid crystal molecules between the outer electrode portion and the gate line can be controlled by an electric field generated between the outer electrode portion and a lower electrode formed larger than the electrode close to the liquid crystal layer, whereby it is possible to further improve the transmittance of the pixels.

In the liquid crystal display device according to the above aspect of the present invention, the electrode close to the liquid crystal layer may be formed such that at least a portion of an outer electrode portion thereof overlaps with a drain line.

According to the configuration, since the outer electrode portion of the electrode close to the liquid crystal layer overlaps with at least a portion of the drain line, the end of the slit can be disposed closer to the drain line, whereby it is possible to further improve the transmittance of the pixels.

In the liquid crystal display device according to the above aspect of the present invention, the slit formed in the electrode close to the liquid crystal layer may be formed at a predetermined tilt angle with respect to a rubbing direction.

According to the configuration, since the slit is formed at a predetermined tilt angle with respect to the rubbing direction, it is possible to stabilize the rotation direction of the liquid crystal molecules of the liquid crystal layer.

In the liquid crystal display device according to the above aspect of the present invention, the slit may be formed using a mask in which an extension electrode portion is formed at a position where a disclination occurs.

According to the configuration, since the slit is formed using a mask in which an extension slit portion is formed at a position of the slit where a disclination occurs, it is possible to prevent the slit from being formed in a circular arc shape and to thus prevent the occurrence of the disclination.

In the liquid crystal display device according to the above aspect of the present invention, the slit may be formed using a mask in which an extension slit portion is formed at a portion of the slit close to an aperture where a disclination occurs.

According to the configuration, since the slit is formed using a mask in which an extension slit portion is formed at a portion of the slit close to an aperture where a disclination occurs when the electrode is formed in a comb-teeth shape, it is possible to prevent an end in the longitudinal direction of the aperture from being formed in a circular arc shape and to thus prevent the occurrence of the disclination.

According to another aspect of the present invention, there is provided a liquid crystal display device that includes a plurality of pixels that forms a display unit, in which each of the pixels includes at least a pair of substrates that is arranged opposite each other with a liquid crystal layer disposed therebetween; and a common electrode and a pixel electrode that are disposed on one substrate of the pair of substrates with an insulating film disposed therebetween so as to drive liquid crystal molecules of the liquid crystal layer. An electrode of the common electrode and the pixel electrode that is disposed closer to the liquid crystal layer is configured such that at least a pair of slit forming regions, each having a slit having a predetermined tilt angle with respect to a rubbing direction, are arranged such that an angle between a longitudinal direction of each of the pixels and a longitudinal direction of the slit in one of the slit forming regions and an angle between the longitudinal direction of each of the pixels and the longitudinal direction of the slit in the other slit forming region have a supplementary relationship. An outer edge of the one slit forming region opposite the other slit forming region is formed in an approximately parallel to the longitudinal direction of the slit.

According to the configuration, an electrode of the common electrode and the pixel electrode that is disposed closer to the liquid crystal layer is configured such that at least a pair of slit forming regions, each having a slit having a predetermined tilt angle with respect to a rubbing direction, are arranged such that an angle between a longitudinal direction of each of the pixels and a longitudinal direction of the slit in one of the slit forming regions and an angle between the longitudinal direction of each of the pixels and the longitudinal direction of the slit in the other slit forming region have a supplementary relationship. Moreover, an outer edge of the one slit forming region opposite the other slit forming region is formed in an approximately parallel to the longitudinal direction of the slit. Therefore, the electrode can be formed in a parallelogram shape with a multi-slit configuration. Moreover, since the opposite outer edges that are in parallel to the slits, of the electrode in which the slits are formed do not have any unnecessary electrode portion, it is possible to improve the transmittance of the pixels.

In the liquid crystal display device according to the above aspect of the present invention, in the respective regions of the pair of slit forming regions, a plurality of slits may be formed in parallel to each other in the electrode close to the liquid crystal layer.

According to the configuration, since in the respective regions of the pair of slit forming regions, a plurality of slits are formed in parallel to each other in the electrode close to the liquid crystal layer, it is possible to improve the transmittance in the respective slit forming regions.

In the liquid crystal display device according to the above aspect of the present invention, the slit may extend to one of the opposite outer edges in the longitudinal direction of the slit, of the electrode close to the liquid crystal layer and the electrode may have a comb-teeth shape.

According to the configuration, since the electrode has a comb-teeth shape, it is possible to further improve the transmittance.

In the liquid crystal display device according to the above aspect of the present invention, the pair of slit forming regions of one electrode may be formed in each of the pixels.

According to the configuration, since the electrodes corresponding to one pixel are configured by an electrode having a multi-slit configuration in which a pair of slit forming regions is formed, it is possible to decrease the gap between the slit forming regions and to thus improve the transmittance in the slit forming regions.

In the liquid crystal display device according to the above aspect of the present invention, an active control portion may be formed in a fringe portion of the one slit forming region so as to control a voltage to be applied to the pixel electrode.

According to the configuration, since the active control portion is formed in a fringe portion of the one slit forming region of the electrode having a multi-slit configuration, the active control portion can be disposed at the corner portions of the pixel. Therefore, it is possible to improve the transmittance of the entire pixels.

In the liquid crystal display device according to the above aspect of the present invention, among two pixels adjacent to each other in the arrangement direction of the slits, a slit forming region of one pixel, adjacent to the other pixel and a slit forming region of the other pixel, adjacent to the one pixel may be arranged such that slits of the slit forming regions are in parallel to each other.

According to the configuration, since the slits of the adjacent slit forming regions of the adjacent pixels are arranged in parallel to each other, the slits can be formed so as to be continuously in parallel to each other between pixels that are adjacent to each other in the arrangement direction of the slits. Therefore, it is possible to form pixels so as to be continuous in the arrangement direction of the slits.

In the liquid crystal display device according to the above aspect of the present invention, a gate line may be disposed at a boundary of the pair of slit forming regions so as to supply a gate signal to a gate of the active control portion that controls the voltage to be applied to the pixel electrode.

According to the configuration, since the active control portion is disposed between the pair of slit forming regions within each pixel, the active control portion can be disposed at a position where the orientation of the slits is changed and the transmittance is lowered. Therefore, it is possible to minimize the size of the pixel region having a multi-slit configuration.

In the liquid crystal display device according to the above aspect of the present invention, the active control portion may be bent such that it crosses the gate line two times.

According to the configuration, since the active control portion is bent such that it crosses the gate line two times, it is possible to decrease the size of the regions where the thin film transistor is formed, and thus, the ratio of a displayable region, that is, an aperture ratio can be increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments will be described with reference to accompanying drawings.

First Embodiment

Figure 1:
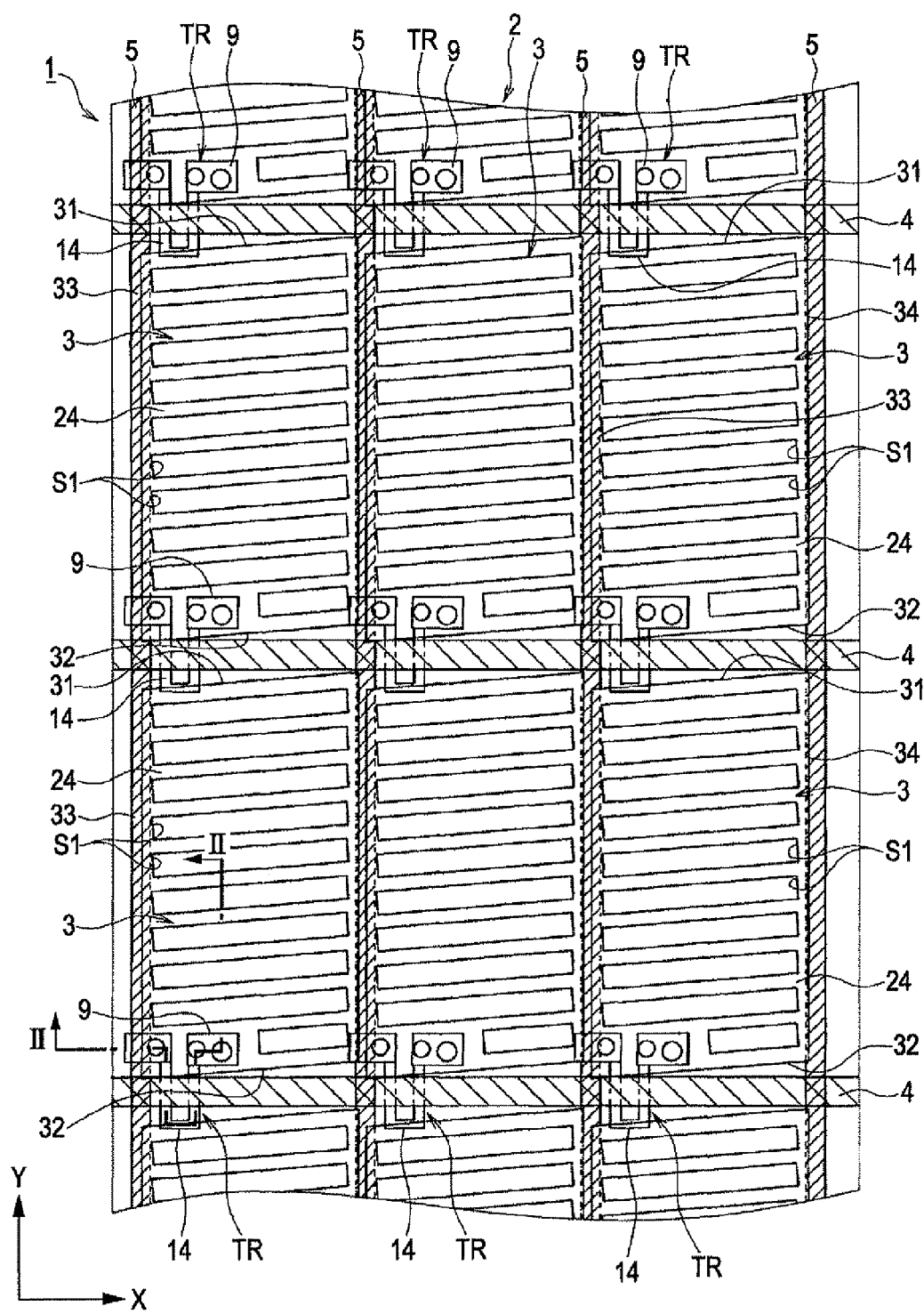
FIG. 1 is a top plan view of a liquid crystal display device according to a first embodiment of the present invention.

FIG. 1 is a top plan view of a liquid crystal display device according to a first embodiment of the present invention, which is operated in an FFS mode of a normally black type. In the drawing, reference numeral 1 generally designates a liquid crystal display device, in which a display unit 2 is configured by a plurality of pixels 3 arranged in matrix. In FIG. 1, only a portion of the entire pixels 3 that constitute the display unit 2 is illustrated.

As illustrated in FIG. 1, the display unit 2 has a rectangular shape wherein the X directions corresponds to a horizontal direction and the Y direction corresponds to a vertical direction, in which a plurality of gate lines 4 to which a pixel selection signal is supplied is arranged in the horizontal direction at predetermined intervals, and a plurality of drain lines 5 to which a display signal is supplied is arranged in the vertical direction at predetermined intervals. Moreover, when the display unit 1 is configured to be viewed through polarized sunglasses, the vertical direction of the display unit 2 is set so as to be in parallel to an absorption axis of the polarized sunglasses.

The pixels 3 are disposed at pixel regions that are surrounded by the gate lines 4 and the drain lines 5. In each pixel 3, a thin film transistor TR in which the gate line 4 is used as a gate electrode thereof is formed in an upper left corner portion of a pixel forming region.

Figure 2:
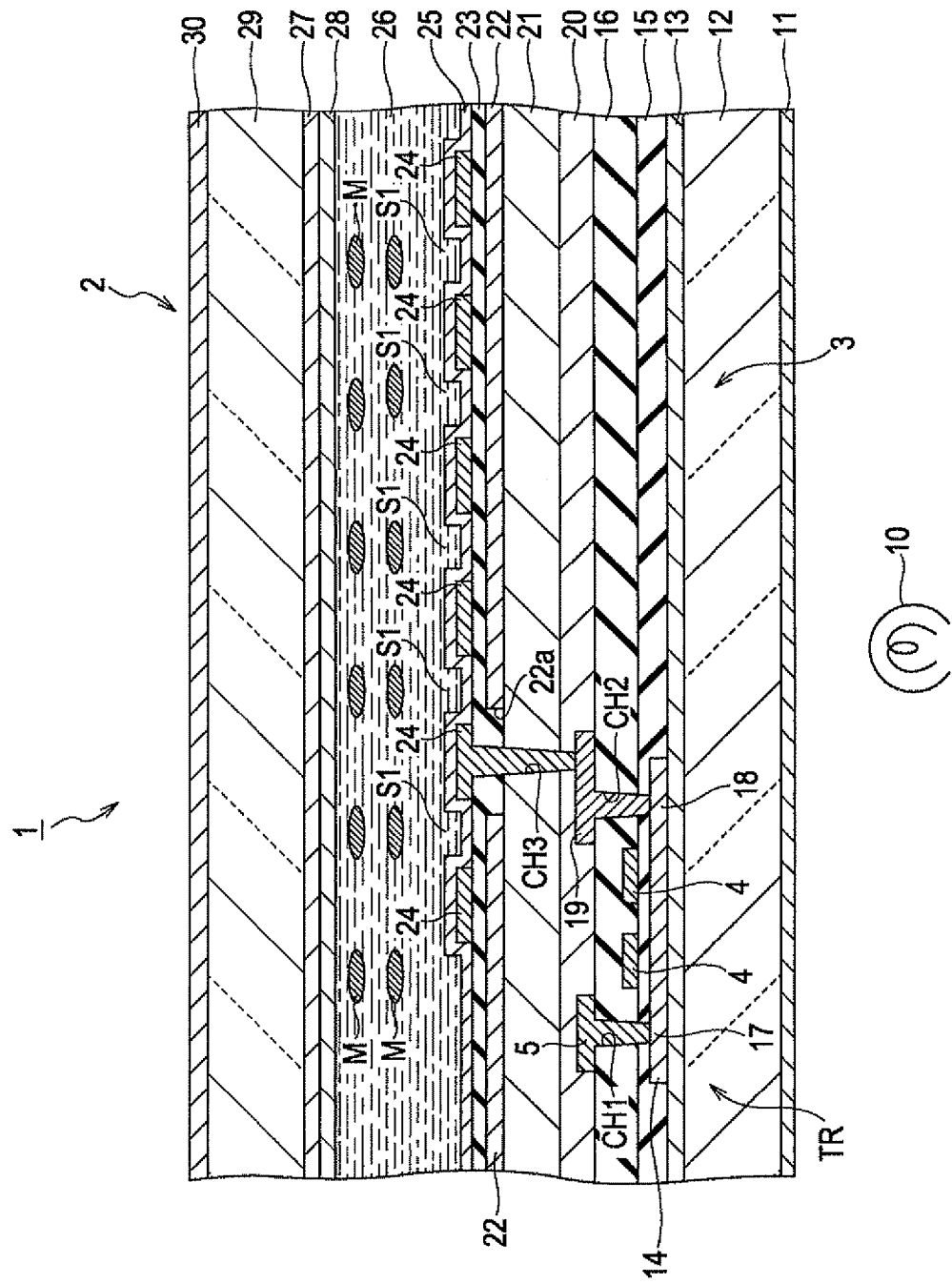
FIG. 2 is a sectional view taken along the line II-II in FIG. 1.

The pixel 3 has a multi-layer structure, as illustrated in the sectional view of FIG. 2, and has a first transparent substrate 12 formed of glass or the like, having a first polarization plate 11 formed on a lower surface thereof opposite a backlight 10. A buffer film 13 is formed on an upper surface of the first transparent substrate 12. An active layer 14 formed of polysilicon and having a generally U shape as viewed in FIG. 1, constituting the thin film transistor TR is formed on an upper surface of the buffer film 13. A gate insulating film 15 is disposed so as to cover the active layer 14.

In a portion of the gate insulating film 15 opposite the active later 14, the gate line 4 is disposed so as to pass through the active layer 14 two times, so that a double gate structure is formed. Moreover, the gate insulating film 15 and the gate line 4 are covered by an interlayer insulating film 16. On the interlayer insulating film 16, a drain line 5 that is connected to the drain 17 of the thin film transistor TR via a contact hole CH1 and a source electrode 19 that is connected to the source 18 of the thin film transistor TR via a contact hole CH2 are arranged.

The drain line 5 and the source electrode 19 are covered by a passivation film 20, and a planarization film 21 is formed on the passivation film 20. It is to be noted that the passivation film 20 is not always necessary and may be omitted.

On the planarization film 21, a common electrode 22 is disposed, having an aperture 22a at a position opposite the source electrode 19. The common electrode 22 is formed, for example, as a beta film in an effective display region where the pixels 3 are arranged, while in regions where the pixels 3 are not present, the common electrode 22 is connected via a contact hole (not shown) to a common electrode line (not shown) to which common potential is supplied. Moreover, the common electrode may be formed in a stripe shape pattern that is parallel to the gate lines and the drain lines and may be connected to each common electrode line and each pixel.

Pixel electrodes 24 are arranged on the common electrode 22 via an insulating film 23. The pixel electrodes 24 are connected to the source electrode 19 via a contact hole CH3 that is formed through the insulating film 23, the aperture 22a of the common electrode 22, the planarization film 21, and the passivation film 20.

The pixel electrodes 24 are covered by an alignment film 25, and a rubbing direction of the alignment film 25 is set so as to be in parallel to the transmission direction of a first polarization plate 11.

Moreover, a second transparent substrate 29 having a color filter 27 and an alignment film 28 formed on a lower surface thereof is disposed above the alignment film 25 via a liquid crystal layer 26 having liquid crystal molecules M. Here, a rubbing direction of the alignment film 28 is identical to the rubbing direction of the above-described alignment film 25. Furthermore, the liquid crystal molecules M of the liquid crystal layer 26 are initially aligned in accordance with the rubbing direction of the alignment films 25 and 28: that is, they are in a homogeneous alignment state.

Further, a second polarization plate 30 having a transmission axis perpendicular to the first polarization plate 11 is disposed on an upper surface of the second transparent substrate 29.

Figure 3:
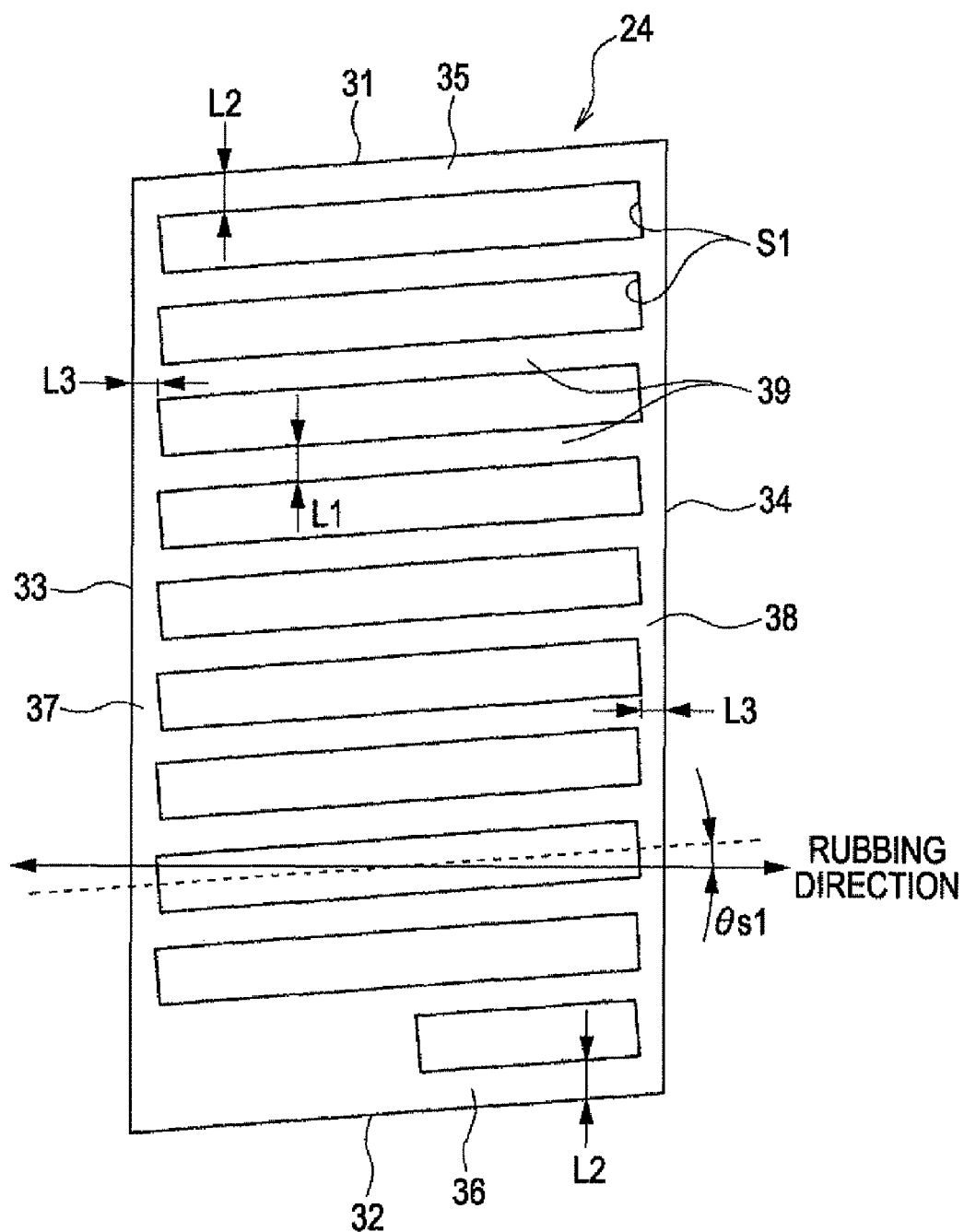
FIG. 3 is top plan view of a pixel electrode shown in FIG. 1.

The rubbing direction of the alignment films 25 and 28 is identical to the horizontal direction (X direction), as illustrated in FIG. 3. As best shown in FIG. 3, each pixel electrode 24 has a so-called single slit configuration, in which a plurality of slits S1 is formed in parallel at predetermined intervals L1 in the vertical direction, each slit having a rectangular shape that is tilted by a predetermined angle $\theta s1$ in the rubbing direction of the alignment films 25 and 28.

Moreover, the pixel electrode 24 is generally parallelogram shaped, wherein opposite outer edges 31 and 32 serving as shorter sides are formed at positions separated by a predetermined distance L2 from both outermost slits S1 in the vertical direction so as to be in parallel to the slits S1, and wherein opposite outer edges 33 and 34 serving as longer sides are formed so as to extend in the vertical direction to connect the left and right ends of the opposite outer edges 31 and 32 with each other.

As will be understood from FIG. 2, the slits S1 are configured as apertures through which a voltage is applied between the pixel electrodes 24 as an upper electrode formed via the insulating film 23 and the common electrode 22 serving as a lower electrode, so that the liquid crystal molecules M are driven by an electric field generated by the voltage application. Since a plurality of slits S1 is formed in parallel to the vertical direction, it is possible to improve the transmittance of the pixel 3.

Moreover, each slit S1 has a tilt angle $\theta s1$ in the range of about +5 degrees to about +15 degrees, for example, and preferably, of about +5 degrees, with respect to the rubbing direction of the alignment films 25 and 28, in order to prevent the rotation direction of the liquid crystal molecules M of the liquid crystal layer 26 from becoming unstable.

Furthermore, both ends in the longitudinal direction of each slit S1 are formed at positions separated inward from the opposite outer edges 33 and 34 of the pixel electrode 24 opposed to the respective ends by a predetermined distance L3. In this manner, each pixel electrode 24 has a configuration in which a parallelogram is formed by outer electrode portions 35 and 36 that form the opposite outer edges 31 and 32, respectively, and outer electrode portions 37 and 38 that form the opposite outer edges 33 and 34, respectively, and in which the outer electrode portions 37 and 38 are connected with each other by connection electrode portions 39 that form the slits S1.

When the pixel electrodes 24 are patterned, in some cases, corner portions thereof are formed to have a slight roundness by a photolithographic process. In order to obviate such a roundness as much as possible, when the pattern of a mask used for the patterning is selected in consideration of an optical proximity effect, the roundness can be suppressed to an ignorable extent.

Moreover, as illustrated in FIG. 1, when the outer electrode portion 35 of the pixel electrode 24 and the drain line 5 are arranged such that at least portions thereof overlap with each other as viewed in plan view, the ends of the slits S1 can be formed closer to the drain line 5; therefore, it is possible to further improve the transmittance of the pixel 3. Furthermore, when the outer electrode portion 35 of the pixel electrode 24 and the gate line 4 are arranged such that they do not overlap with each other, the liquid crystal molecules M between the outer electrode portion 35 and the gate line 4 can be controlled by means of an electric field generated between the outer electrode portion 35 and the common electrode 22 serving as the lower electrode, which is formed larger than the pixel electrode 24; therefore, it is possible to further improve the transmittance of the pixel 3.

The operation of the liquid crystal display device 1 having such a configuration will be described with reference to FIG. 2. In an off state where an electric field is not generated between the common electrode 22 and the pixel electrode 24, the liquid crystal molecules M of the liquid crystal layer 26 are in an homogeneous alignment state, wherein the longer axis direction of the liquid crystal molecules is in parallel to the transmission axis of the first polarization plate 11, for example. In this case, light from the backlight 10 that is linearly polarized by the first polarization plate 11 passes through the liquid crystal layer 26 with a polarization axis unchanged and is then incident on the second polarization plate 30. However, since the polarization axis of the light is in parallel to the transmission axis of the second polarization plate 30, the light is absorbed by the second polarization plate 30. That is, images are displayed as black (a normally black display).

On the other hand, in an on state where an electric field is generated between the common electrode 22 and the pixel electrode 24, the longer axis of the liquid crystal molecules M of the liquid crystal layer 26 is rotated so as to be approximately in parallel to the first transparent substrate 12 in accordance with the electric field. In this case, light from the backlight 10 that is linearly polarized by the first polarization plate 11 is elliptically polarized as it suffers birefringence in the liquid crystal layer 26 and is then incident on the second polarization plate 30. Among the elliptically polarized light, a component of which a polarization axis is identical to the transmission axis of the second polarization plate 30 is emitted, so that images are displayed as white.

At this time, since the opposite outer edges 31 and 32 of the outer electrode portions 35 and 36 of the pixel electrode 24 are formed in parallel to the slits S1, compared with a case where the pixel electrode 24 is generally rectangular, the outer electrode portions 35 and 36 do not have any unnecessary margin; therefore, it is possible to improve the transmittance of the pixels 3.

When the pixels 3 in which the pixel electrodes 24 are arranged are operated by a so-called line inversion driving method, display signals of different polarities are supplied to the respective pixel electrodes 24 of pixels 3 that are adjacent to each other in the vertical direction. For this reason, a desired display result is not obtained due to interference between different display signals, and thus, display defects may occur in the vicinity of boundaries of such pixels 3. In order to obviate such display defects, it would be good to separate the respective pixel electrodes 24 of the pixels 3 adjacent to each other in the vertical direction as much as possible; however, the transmittance may decrease when the separation distance is too large.

The distance between the opposite outer edge 31 of one pixel electrode 24 and the opposite outer edge 32 of the other pixel electrode 24 is preferably set to a value twice or slightly more than twice a distance where the liquid crystal molecules M disposed outside the opposite outer edges 31 and 32 of the pixel electrodes 24 can be rotated by a desired angle by an electric field. For example, the distance D1 between the outer edge 31 of one pixel electrode 24 of the respective adjustment pixel electrodes 24 and the outer edge 32 of the other pixel electrode 24 is in the range of 5 θµm<D1<15 µm, and preferably, it is in the range of 7 µm<D1<10 µm for best results.

Figure 4:
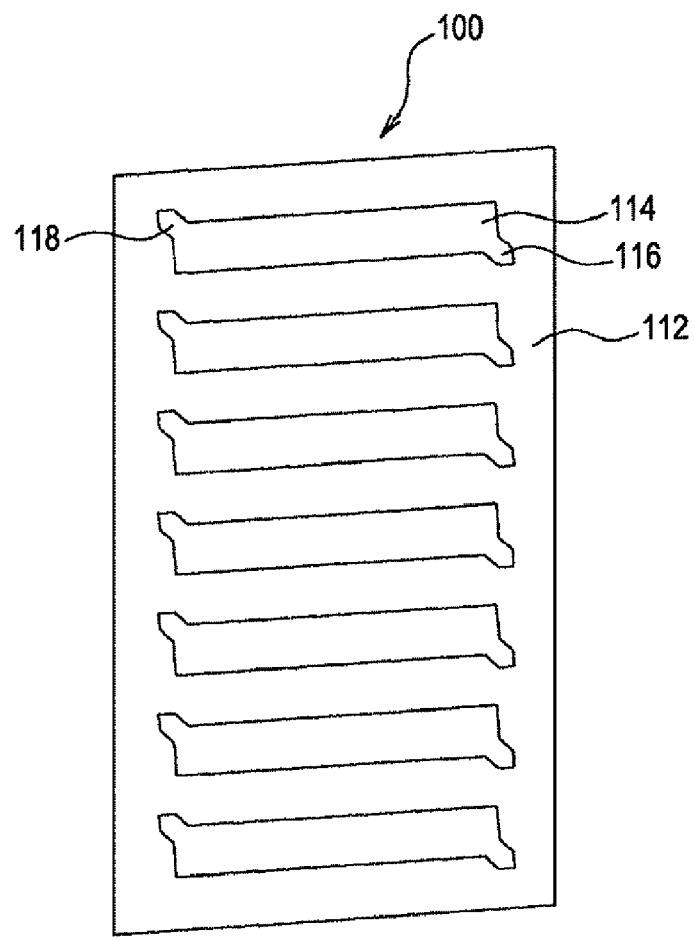
FIG. 4 is a top plan view of an aperture forming mask according to the first embodiment.

In the first embodiment, when the ends of the slits S1 have a roundness, in some regions, the rotation direction of the liquid crystal molecules M may be inverted with respect to a desired direction, with the result that there occurs a disclination, which is a phenomenon that in regions where images are to be displayed as white, images are displayed as black, and thus the transmittance decreases. In order to suppress the occurrence of the disclination, it is necessary to obviate the roundness of the ends of the slits S1, and for this reason, an aperture electrode forming mask 100 as illustrated in FIG. 4 is used as a mask used for a photolithographic process.

The aperture electrode forming mask 100 is configured such that basic transmission pattern portions 114 having a shape corresponding to the shape of the slits S1 are formed at positions of a non-transmission pattern portion 112 opposite the slits S1 of the pixel electrode 24, and correction transmission pattern portions 116 and 118 are formed at portions of each of the basic transmission pattern portions 114 where a disclination occurs, so that the basic transmission pattern portion 114 is expanded to suppress the occurrence of the disclination.

Here, similar to the case of the first embodiment where the slits S1 are tilted in the positive direction, i.e., a counter-clockwise direction, with respect to the rubbing direction, considering an XY coordinate system in which an origin is at the central point of each slit S1, the X axis corresponds to the longitudinal direction of the slit, and the Y axis corresponds to the width direction of the slit, the portions of the basic transmission pattern portion 114 correspond to corner portions of each slit in the second and fourth quadrants of the XY coordinate system. In a case where the slits S1 are tilted in the negative direction, i.e., a clockwise direction, with respect to the rubbing direction, the disclination occurs at corner portions of each slit in the first and third quadrants of the XY coordinate system.

Figure 5:
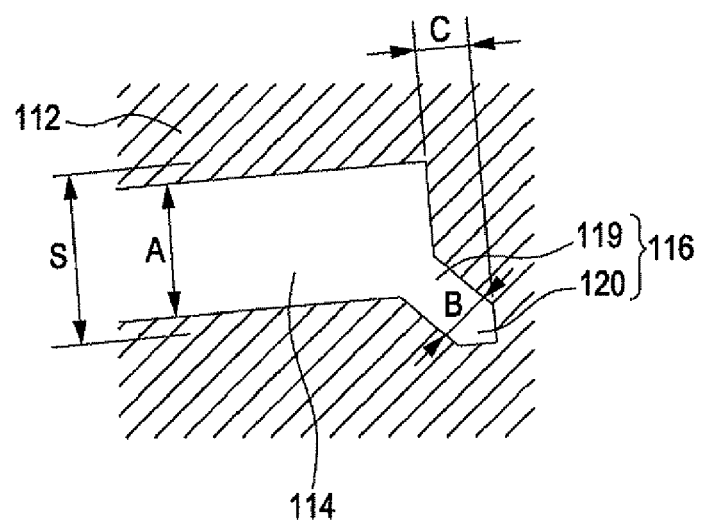
FIG. 5 is a detailed view of a correction transmission pattern portion shown in FIG. 4.

As illustrated in an enlarged view in FIG. 5, the correction transmission pattern portion 116 is formed continuous with the basic transmission pattern portion 114 in such a fashion that the basic transmission pattern portion 114 is expanded into the non-transmission pattern portion 112. The correction transmission pattern portion 116 includes a relatively narrow strip-shaped pattern portion 119 that is continuous with the basic transmission pattern portion 114 and extends with a tilt angle of about 45 degrees in a counter-clockwise direction with respect to the longitudinal direction, i.e., the x axis and a triangular pattern portion 120 having a rectangular equilateral triangular shape, for example, that is formed at an extension end of the strip-shaped pattern portion 119.

Here, a width dimension B of the strip-shaped pattern portion 119 and an extension dimension C from the end of the basic transmission pattern portion 114 to a distal end of the triangular pattern portion 120 are set so as to be smaller than a width dimension A of the basic transmission pattern portion 114.

For example, when a slit width S of the pixel electrode 24 formed after etching is about 4.0 µm, the width dimension A of the basic transmission pattern portion 114 may be set to about 3.4 µm, and in this case, the extension dimension C and the width dimension B of the correction transmission pattern portion 116 may be set to about 1.75 µm and about 1.4 µm, respectively.

In high-definition liquid crystal display devices, the width dimension A of the basic transmission pattern portion 114 is often set to a minimum dimension as small as close to the limit of a resolution of an exposure device. Therefore, in general liquid crystal display devices, even when the minimum dimension of the pattern of the aperture electrode forming mask is decreased to a value smaller than the resolution of the exposure device, the exposure cannot be performed in a desired dimension and shape. However, it is possible to obtain a fine pattern equal to or smaller than the resolution of the exposure device by utilizing the optical proximity effect. This is based on the findings that when a correction pattern portion having a shape and dimension considering diffraction of light or the like is provided at a fringe portion of a basic pattern portion close to the limit of the resolution of the exposure device to correct the shape of the fringe portion of the basic pattern portion, it is possible to form a pattern having a precision equal to or higher than the resolution of the exposure device. In the example of FIG. 4, only in the basic transmission pattern portion 114, an exposure pattern thereof is circular arc shaped at an end portion thereof in the longitudinal direction by the limit of the resolution of the exposure device. However, by providing the correction transmission pattern portion 116, the circular arc shape is corrected, and thus, an exposure pattern having a shape quite close to a rectangular shape can be obtained.

In order to utilize the optical proximity effect, the dimension of the correction transmission pattern portion 116 is set so as to be smaller than the minimum dimension of the basic transmission pattern portion 114. In the example described above, when the resolution of the exposure device is about 3 µm, the minimum dimension of the basic transmission pattern portion 114 can be set to about 3.4 µm that is larger than the resolution of about 3 µm of the exposure device, and the minimum dimension of the correction transmission pattern portion 116 can be set to about 1.4 μm that is smaller than the resolution of about 3 μm of the exposure device.

Such an aperture electrode forming mask 100 can be formed in accordance with a manufacturing method of a general exposure mask such that the minimum dimension of the basic transmission pattern portion 114 is set to a value within an allowable range of the resolution of the exposure device, and the correction transmission pattern portion 116 having a dimension smaller than the resolution of the exposure device is provided at an end portion in the longitudinal direction of the basic transmission pattern portion 114.

Although detailed illustration of the correction transmission pattern portion 118 is omitted, the correction transmission pattern portion 118 has a shape that is linearly symmetrical to the shape of the correction transmission pattern portion 116.

When exposure is performed using the aperture electrode forming mask 100 having such a configuration, light passes through the basic transmission pattern portion 114 and the correction transmission pattern portions 116 and 118, whereby a photosensitive resist is exposed. When the photosensitive resist is exposed, characteristics thereof are changed, and the exposed portions can be removed by using appropriate development solution, whereby apertures having the same shape as that of the basic transmission pattern portion 114 are formed on the photosensitive resist. In this way, when etching is performed on a transparent conductive material film for pixel electrodes using the photosensitive resist having the apertures formed therein, the pixel electrode 24 having the slits S1 having a shape corresponding to the apertures of the photosensitive resist is obtained.

Second Embodiment

Next, a second embodiment of the invention will be described with reference to FIG. 6.

In the second embodiment, the tilt angle of the slits S1 formed in the pixel electrode 24 and the rubbing direction of the alignment films 25 and 30 are selected so as to suppress the occurrence of the disclination. Due to patterning limitations during manufacturing, since the ends of the slit S1 are patterned in a circular arc shape, an angle between the rubbing direction and the direction of an electric field that extends from the electrode portion of the pixel electrode to the common electrode formed on the lower surfaces of the slits S1 is not uniform. Therefore, in some regions, the rotation direction of the liquid crystal molecules M may be inverted with respect to a desired direction, with the result that there occurs a disclination, which is a phenomenon that in regions where images are to be displayed as white, images are displayed as black, and thus the transmittance decreases. In the second embodiment, the occurrence of the disinclination is suppressed to thereby increase the transmittance of the pixels.

Figure 6:
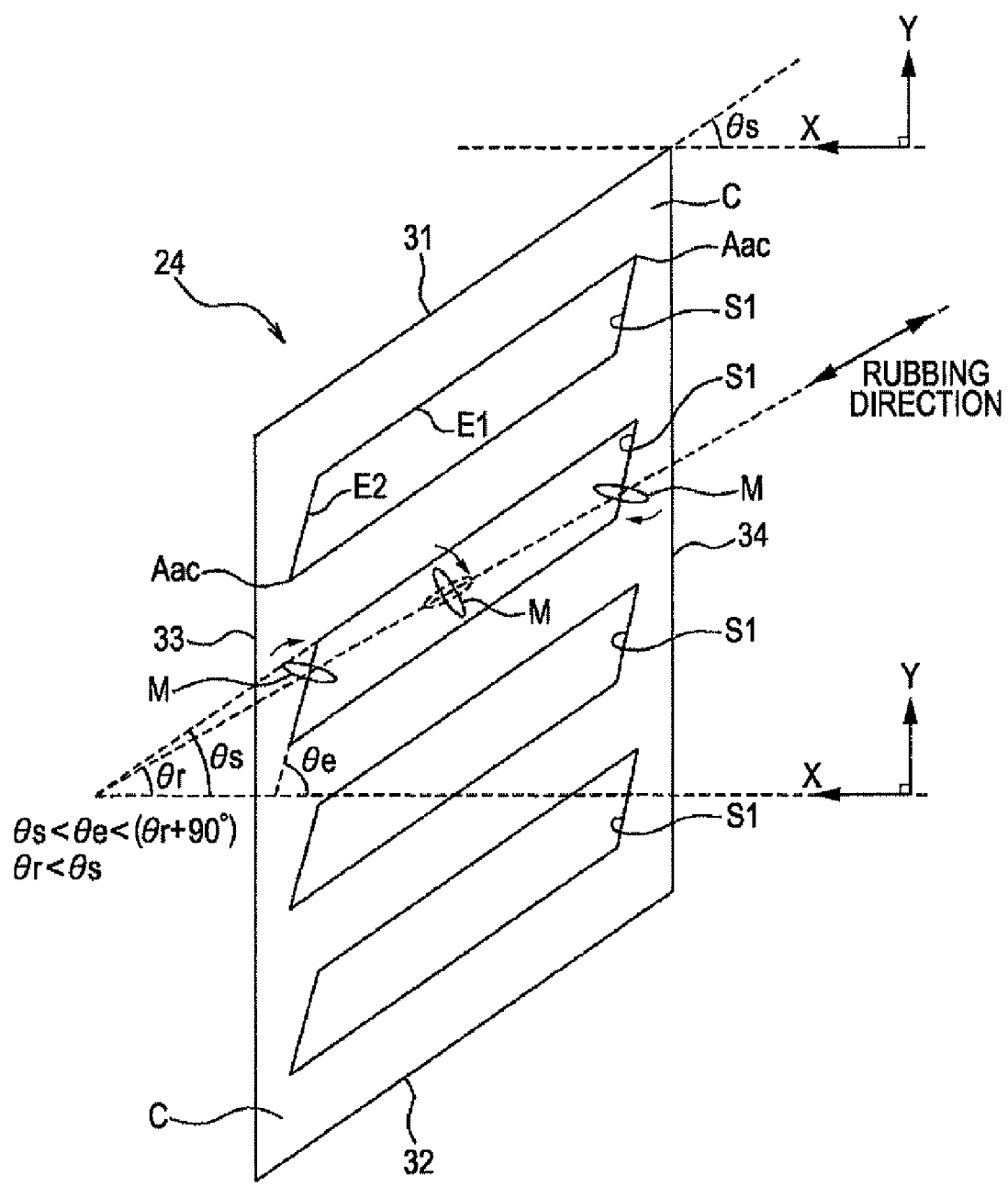
FIG. 6 is a top plan view of a pixel electrode according to a second embodiment of the present invention.

Specifically, in the second embodiment, as illustrated in FIG. 6, the rubbing direction of the alignment films 25 and 30 has a tilt angle θr with respect to the horizontal direction (X direction). The tilt angle θr is in the range of about +20 degrees to about +50 degrees, for example, and preferably, of about +30 degrees. The transmission axis of the first polarization plate 11 is, for example, in parallel to the rubbing direction.

In the pixel electrode 24 having a generally or approximately parallelogram shape, a plurality of slits S1 each having a generally or approximately parallelogram shape with longer sides E1 and shorter sides E2 is arranged in parallel to each other. The longer sides E1 of the parallelogram-shaped pixel electrode 24 are in parallel to the vertical direction of the display unit 2. A tilt angle θs of the longer sides E1 of each slit S1 with respect to the horizontal direction of the display unit 1 is set to a value larger than the tilt angle θr of the rubbing direction by about +5 degrees to about +15 degrees, for example, and preferably, about +5 degrees, in order to prevent the rotation direction of the liquid crystal molecules M of the liquid crystal layer 26 from becoming unstable.

On the other hand, a tilt angle θe of the shorter sides E2 of each slit S1 with respect to the horizontal direction is set to a value larger than the tilt angle θs of the longer sides E1 but smaller than [θr+90 degrees]. That is, in the pixel electrode 24, one corner portion Aac at the ends of each slit S1 forms an aperture having an acute angle.

Moreover, the opposite outer edges 31 and 32 on the shorter sides of the pixel electrode 24 have a tilt angle θs with respect to the horizontal direction. That is, the opposite outer edges 31 and 32 of the pixel electrode 24 are in parallel to the longer sides E1 of the slits S1. The opposite outer edges 31 and 32 cross the opposite outer edges 33 and 34 that extend in the vertical direction at an acute angle. That is, corner portions C having an acute angle are formed at a portion where the opposite outer edge 31 and the opposite outer edge 34 cross each other and a portion where the opposite outer edge 32 and the opposite outer edge 33 cross each other.

When the pixel electrodes 24 are patterned, in some cases, the corner portions Aac of the slits S1 and the corner portions C at the outer edges of the pixel electrodes 24 are formed to have a slight roundness due to the optical proximity effect of the photolithographic process. In order to obviate such a roundness as much as possible, when the pattern of a mask used for the patterning is selected in consideration of an optical proximity effect, the roundness can be suppressed to an ignorable extent.

According to the second embodiment, since the pixel electrode 24 is configured such that the inversion of the rotation direction of the liquid crystal molecules M is not likely to occur in the vicinity the acute angled corner portions Aac of the slits S1, it is possible to suppress the occurrence of the disclination. Moreover, in the vicinity of the other ends of the slits S1, the inversion of the rotation direction of the liquid crystal molecules M does not occur essentially, the disclination does not occur.

Furthermore, since the regions that extend along the opposite outer edges 31 and 32 of the pixel electrode 24 are in parallel to the longer sides E1 of the slits S1, the shorter sides E2 of the slits S1 are not present in the regions that extend along the opposite outer edges 31 and 32. Further, since the inversion of the rotation direction of the liquid crystal molecules M does not occur in the regions, the disclination does not occur. In addition, by an electric field generated between the opposite outer edges 31 and 32 of the pixel electrode 24 and the common electrode 22 disposed outside the opposite outer edges 31 and 32, the rotation angle of the liquid crystal molecules M in the regions can be controlled so as to be identical to an angle within the pixel 3. As a result, the regions can be used for display. With this configuration, the disclination in the entire pixels 3 can be lowered, and the transmittance can be increased.

In this case, among the ends of the slits S1 that extend in the opposite outer edges 33 and 34 of the pixel electrode 24, a distance between the opposite outer edges 33 and 34 and the ends of the slits S1 nearest to the opposite outer edges 33 and 34 requires a predetermined distance due to reasons such as forming of electrode materials. When the distance from the opposite outer edges 33 and 34 to the nearest ends is set to the predetermined distance, the ends of the slits S1 may be located further away from the opposite outer edges 33 and 34.

Such a margin in the edges of the pixel electrode 24 may decrease the transmittance, and in particular, when the opposite outer edges 33 and 34 of the pixel electrode 24 are longer than the opposite outer edges 31 and 32, the number of locations where the disclination occurs may increase. That is, the transmittance in the entire pixels 3 is extremely decreased. To the contrary, in the present embodiment, since the tilt angle θs of the slits S1 is larger than the tilt angle θr of the rubbing direction, it is possible to decrease the distance between the ends of the slits S1 at the edges of the pixel electrode 24 and the opposite outer edges 33 and 34 of the pixel electrode 24. Therefore, it is possible to prevent decrease in the transmittance.

Third Embodiment

Next, a third embodiment of the invention will be described with reference to FIGS. 7 and 8.

In the third embodiment, a pixel electrode has a comb-teeth shape.

Figure 7:
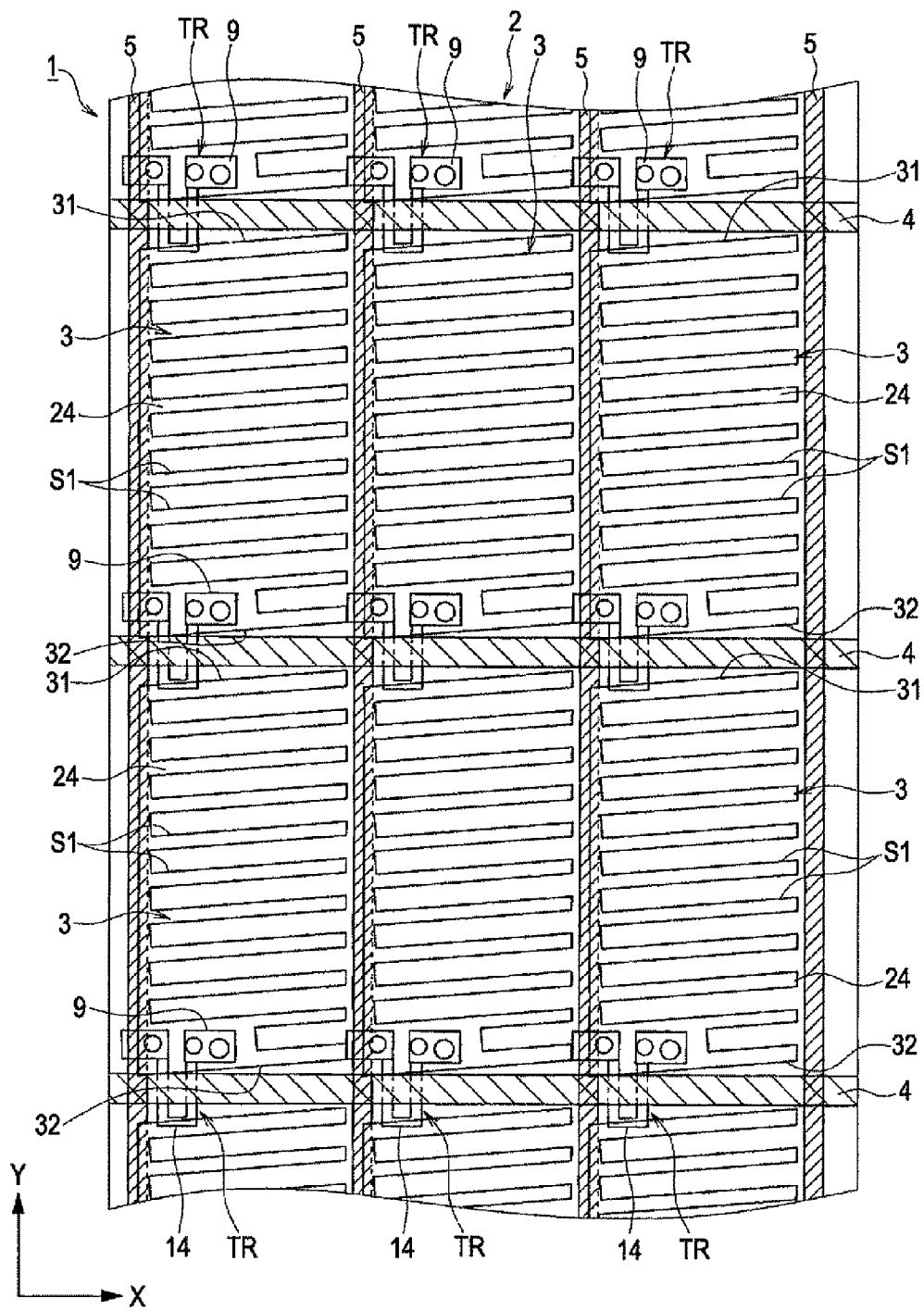
FIG. 7 is a top plan view of a liquid crystal display device according to a third embodiment of the present invention.
Figure 8:
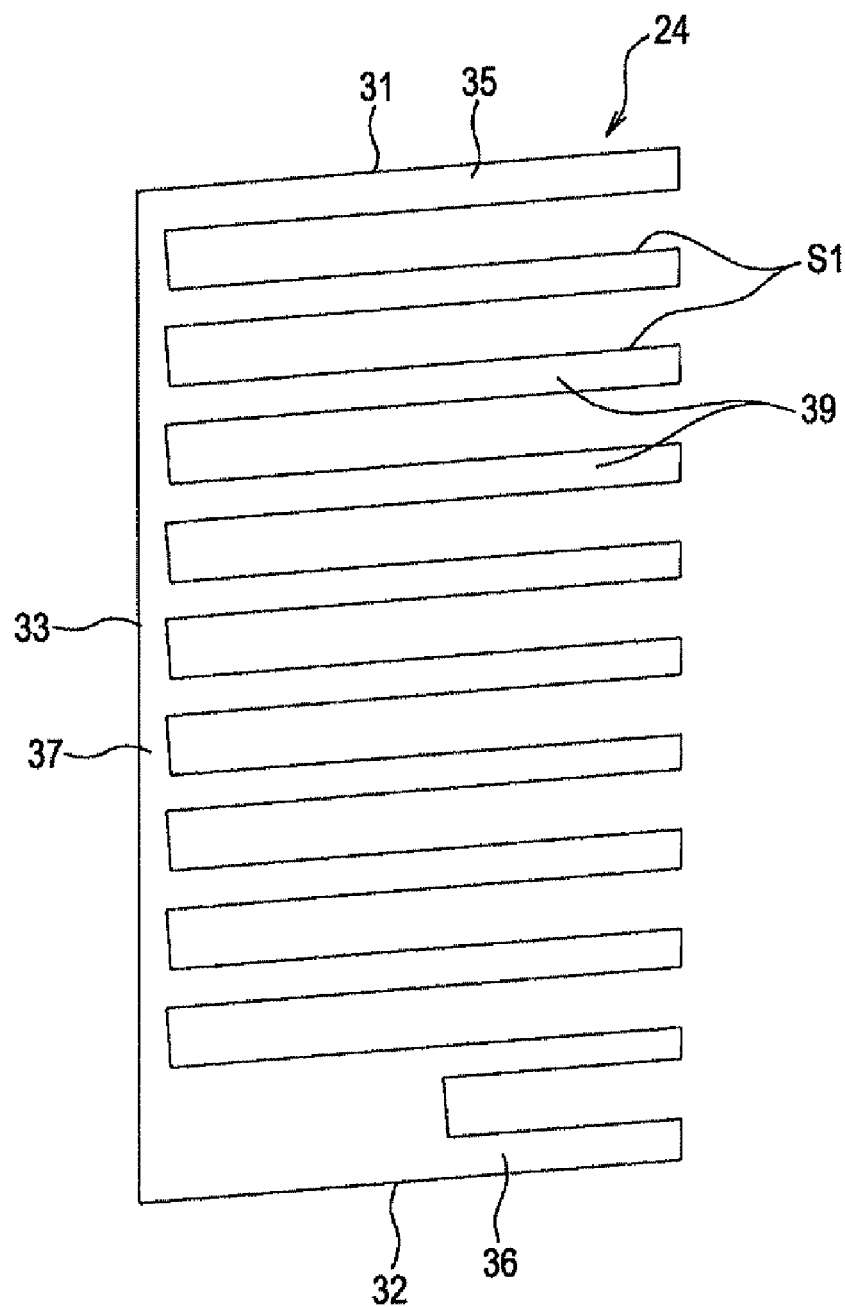
FIG. 8 is a top plan view of a pixel electrode shown in FIG. 7.

Specifically, as illustrated in FIGS. 7 and 8, the third embodiment has the same configuration as that of the first embodiment illustrated in FIGS. 1 and 3, except that the outer electrode portion 38 on the right side of the pixel electrode 24 according to the first embodiment is not formed, and the pixel electrode 24 has a comb-teeth shape. The same constituent elements as those of FIGS. 1 and 3 will be referenced by the same reference numerals, and the detailed descriptions thereof will be omitted.

According to the third embodiment, since the outer electrode portion 38 of the pixel electrode 24 according to the first embodiment is not formed and the pixel electrode 24 has a comb-teeth shape, the slits S1 do not have ends at one sides thereof, and thus, it is possible to improve the transmittance.

Figure 9:
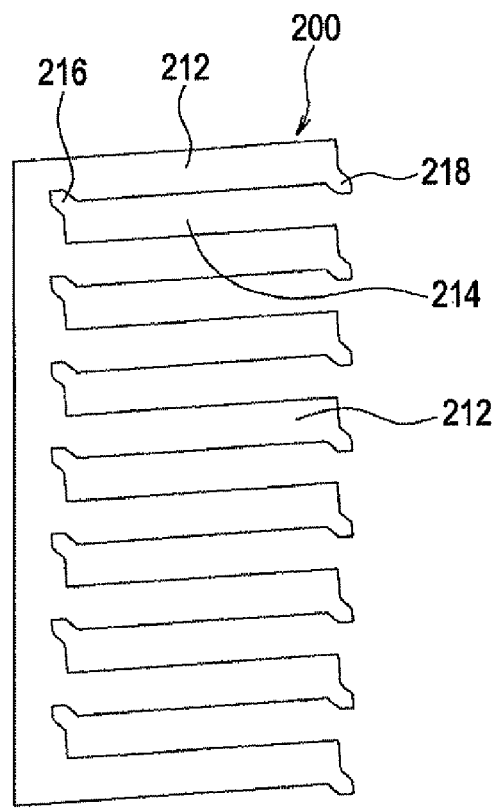
FIG. 9 is a top plan view of an aperture forming mask according to the third embodiment.

In the third embodiment, in order to prevent the occurrence of the disclination, it is necessary to obviate a roundness of the ends of the comb-teeth shaped pixel electrode 24. For this reason, an aperture electrode forming mask 200 as illustrated in FIG. 9 is used as a mask used for a photolithographic process.

The aperture electrode forming mask 200 is configured such that basic transmission pattern portions 214 having a shape corresponding to the shape of the slits S1 are formed at positions of a non-transmission pattern portion 212 opposite the slits S1 of the pixel electrode 24, a correction non-transmission pattern portion 216 is formed at a portion of each of the basic transmission pattern portions 214 where a disclination occurs, so that the basic transmission pattern portion 214 is reduced to suppress the occurrence of the disclination, and a correction transmission pattern portion 218 is formed at a portion of each of the basic transmission pattern portions 214, so that the basic transmission pattern portion 214 is expanded to suppress the occurrence of the disclination.

Here, in the case of the third embodiment where the slits S1 are tilted in the positive direction, i.e., a counter-clockwise direction, with respect to the rubbing direction, considering an XY coordinate system in which an origin is at the central point of each slit S1, the X axis corresponds to the longitudinal direction of the slit, and the Y axis corresponds to the width direction of the slit, the portions of the basic transmission pattern portion 114 correspond to corner portions D of each slit in the second and fourth quadrants of the XY coordinate system. In a case where the slits S1 are tilted in the negative direction, i.e., a clockwise direction, with respect to the rubbing direction, the disclination occurs at corner portions of each slit in the first and third quadrants of the XY coordinate system.

Figure 10:
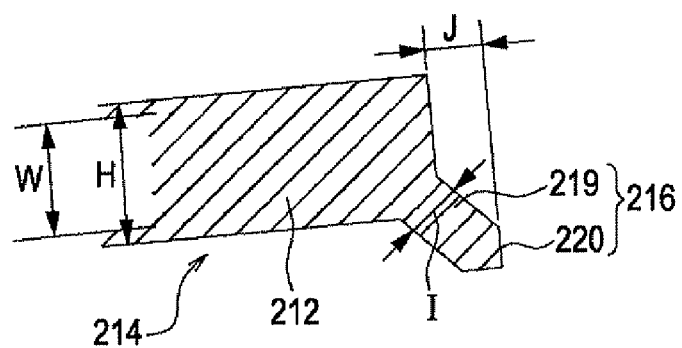
FIG. 10 is a detailed view of a correction non-transmission pattern portion of an aperture forming mask.

As illustrated in an enlarged view in FIG. 10, the correction non-transmission pattern portion 216 is formed continuous with the non-transmission pattern portion 212 in such a fashion that the non-transmission pattern portion 212 is expanded into the basic transmission pattern portion 214, in other words, in such a fashion that the basic transmission pattern portion 214 is reduced. The correction transmission pattern portion 216 includes a relatively narrow strip-shaped pattern portion 219 that is continuous with the non-transmission pattern portion 212 and extends with a tilt angle of about 45 degrees in a counter-clockwise direction with respect to the longitudinal direction, i.e., the X axis and a triangular pattern portion 220 having a rectangular equilateral triangular shape, for example, that is formed at an extension end of the strip-shaped pattern portion 219.

Here, a width dimension I of the strip-shaped pattern portion 219 and an extension dimension J from the end of the non-transmission pattern portion 212 to a distal end of the triangular pattern portion 220 are set so as to be smaller than a width dimension H of the non-transmission pattern portion 212.

For example, when a width, i.e., a line width dimension W of the narrow electrode portion of the pixel electrode 24 formed after etching is about 3.0 μm, the width dimension H of the non-transmission pattern portion 212 may be set to about 3.6 μm, and in this case, the extension dimension J of the correction non-transmission pattern portion 216 and the width dimension I may be set to about 1.5 μm and about 1.4 μm, respectively.

As described above with reference to FIGS. 4 and 5, it is possible to obtain a fine pattern equal to or smaller than the resolution of the exposure device by utilizing the optical proximity effect. In the example of FIG. 10, only in the basic transmission pattern portion 214 or the non-transmission pattern portion 212, an exposure pattern thereof is circular arc shaped at an end portion thereof in the longitudinal direction by the limit of the resolution of the exposure device. However, by providing the fine correction non-transmission pattern portion 216, the circular arc shape is corrected, and thus, an exposure pattern having a shape quite close to a rectangular shape can be obtained.

In order to utilize the optical proximity effect, the dimension of the correction non-transmission pattern portion 216 is set so as to be smaller than the minimum dimension of the basic transmission pattern portion 214 or the non-transmission pattern portion 212. In the example described above, when the resolution of the exposure device is about 3 μm, the minimum dimension of the basic transmission pattern portion 214 can be set to about 3.6 μm that is larger than the resolution of about 3 μm of the exposure device, and the minimum dimension of the correction non-transmission pattern portion 216 can be set to about 1.4 μm that is smaller than the resolution of about 3 μm of the exposure device.

Such an aperture electrode forming mask 200 can be formed in accordance with a manufacturing method of a general exposure mask such that the minimum dimension of the basic transmission pattern portion 214 is set to a value within an allowable range of the resolution of the exposure device, and the correction transmission pattern portion 216 having a dimension smaller than the resolution of the exposure device is provided at an end portion in the longitudinal direction of the basic transmission pattern portion 214.

The correction transmission pattern portion 218 has the same configuration as that of the correction transmission pattern portion 118 described above and illustrated in FIGS. 4 and 5.

In the third embodiment, the pixel electrode 24 according to the first embodiment is configured to have a comb-teeth shape; however, the present invention is not limited to this, and the pixel electrode according to the second embodiment may be configured to have a comb-teeth shape.

Fourth Embodiment

Next, a fourth embodiment of the invention will be described with reference to the accompanying drawings.

Figure 12:
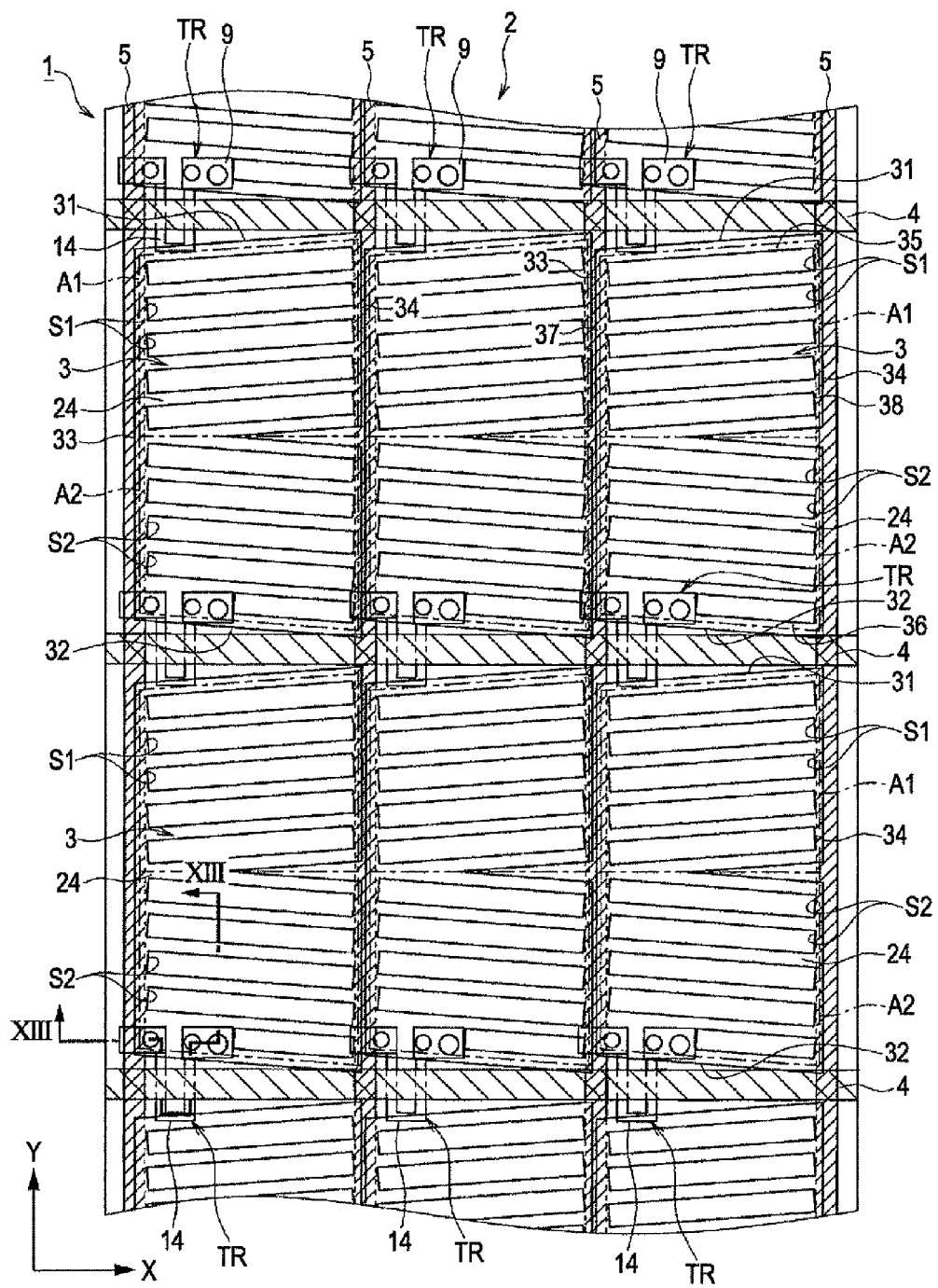
FIG. 12 is a top plan view of a liquid crystal display device according to a fourth embodiment of the present invention.

FIG. 12 is a top plan view of a liquid crystal display device according to a first embodiment of the present invention, which is operated in an FFS mode of a normally black type. In the drawing, reference numeral 1 generally designates a liquid crystal display device, in which a display unit 2 is configured by a plurality of pixels 3 arranged in matrix. In FIG. 12, only a portion of the entire pixels 3 that constitute the display unit 2 is illustrated.

As illustrated in FIG. 12, the display unit 2 has a rectangular shape wherein the X directions corresponds to a horizontal direction and the Y direction corresponds to a vertical direction, in which a plurality of gate lines 4 to which a pixel selection signal is supplied is arranged in the horizontal direction at predetermined intervals, and a plurality of drain lines 5 to which a display signal is supplied is arranged in the vertical direction at predetermined intervals. Moreover, when the display unit 1 is configured to be viewed through polarized sunglasses, the vertical direction of the display unit 2 is set so as to be in parallel to an absorption axis of the polarized sunglasses.

The pixels 3 are disposed at pixel regions that are surrounded by the gate lines 4 and the drain lines 5. In each pixel 3, a thin film transistor TR in which the gate line 4 is used as a gate electrode thereof is formed in an upper left corner portion of a pixel forming region.

Figure 13:
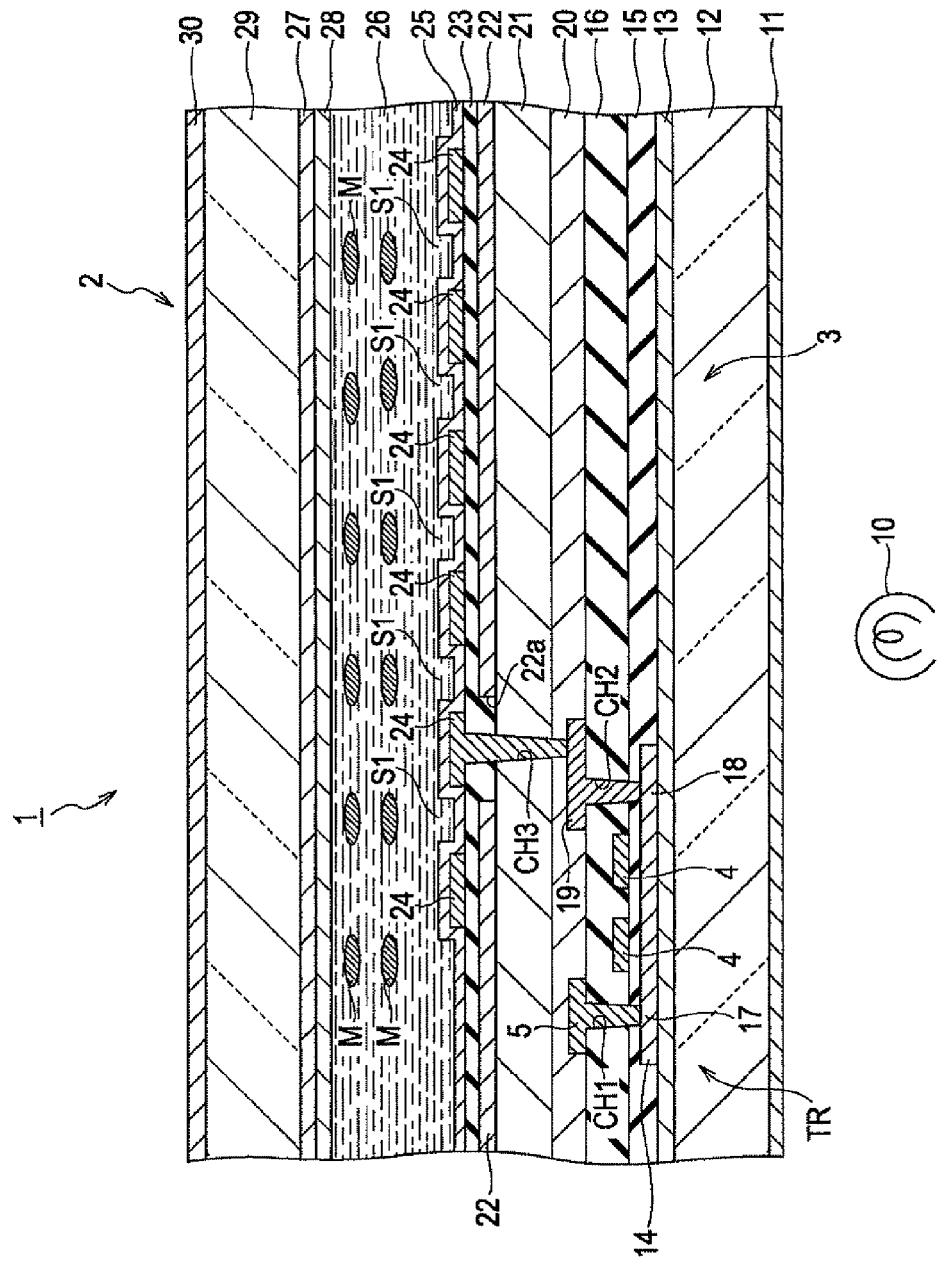
FIG. 13 is a sectional view taken along the line XIII-XIII in FIG. 12.

The pixel 3 has a multi-layer structure, as illustrated in the sectional view of FIG. 13, and has a first transparent substrate 12 formed of glass or the like, having a first polarization plate 11 formed on a lower surface thereof opposite a backlight 10. A buffer film 13 is formed on an upper surface of the first transparent substrate 12. An active layer 14 formed of polysilicon and having a generally U shape as viewed in FIG. 12, constituting the thin film transistor TR is formed on an upper surface of the buffer film 13. A gate insulating film 15 is disposed so as to cover the active layer 14.

In a portion of the gate insulating film 15 opposite the active later 14, the gate line 4 is disposed so as to pass through the active layer 14 two times, so that a double gate structure is formed. Moreover, the gate insulating film 15 and the gate line 4 are covered by an interlayer insulating film 16. On the interlayer insulating film 16, a drain line 5 that is connected to the drain 17 of the thin film transistor TR via a contact hole CH1 and a source electrode 19 that is connected to the source 18 of the thin film transistor TR via a contact hole CH2 are arranged.

The drain line 5 and the source electrode 19 are covered by a passivation film 20, and a planarization film 21 is formed on the passivation film 20. It is to be noted that the passivation film 20 is not always necessary and may be omitted.

On the planarization film 21, a common electrode 22 is disposed, having an aperture 22a at a position opposite the source electrode 19. The common electrode 22 is formed, for example, as a beta film in an effective display region where the pixels 3 are arranged, while in regions where the pixels 3 are not present, the common electrode 22 is connected via a contact hole (not shown) to a common electrode line (not shown) to which common potential is supplied. Moreover, the common electrode may be formed in a stripe shape pattern that is parallel to the gate lines and the drain lines and may be connected to each common electrode line and each pixel.

Pixel electrodes 24 are arranged on the common electrode 22 via an insulating film 23. The pixel electrodes 24 are connected to the source electrode 19 via a contact hole CH3 that is formed through the insulating film 23, the aperture 22a of the common electrode 22, the planarization film 21, and the passivation film 20.

The pixel electrodes 24 are covered by an alignment film 25, and a rubbing direction of the alignment film 25 is set so as to be in parallel to the transmission direction of a first polarization plate 11.

Moreover, a second transparent substrate 29 having a color filter 27 and an alignment film 28 formed on a lower surface thereof is disposed above the alignment film 25 via a liquid crystal layer 26 having liquid crystal molecules M. Here, a rubbing direction of the alignment film 28 is identical to the rubbing direction of the above-described alignment film 25. Furthermore, the liquid crystal molecules X of the liquid crystal layer 26 are initially aligned in accordance with the rubbing direction of the alignment films 25 and 28; that is, they are in a homogeneous alignment state.

Further, a second polarization plate 30 having a transmission axis perpendicular to the first polarization plate 11 is disposed on an upper surface of the second transparent substrate 29.

Figure 14:
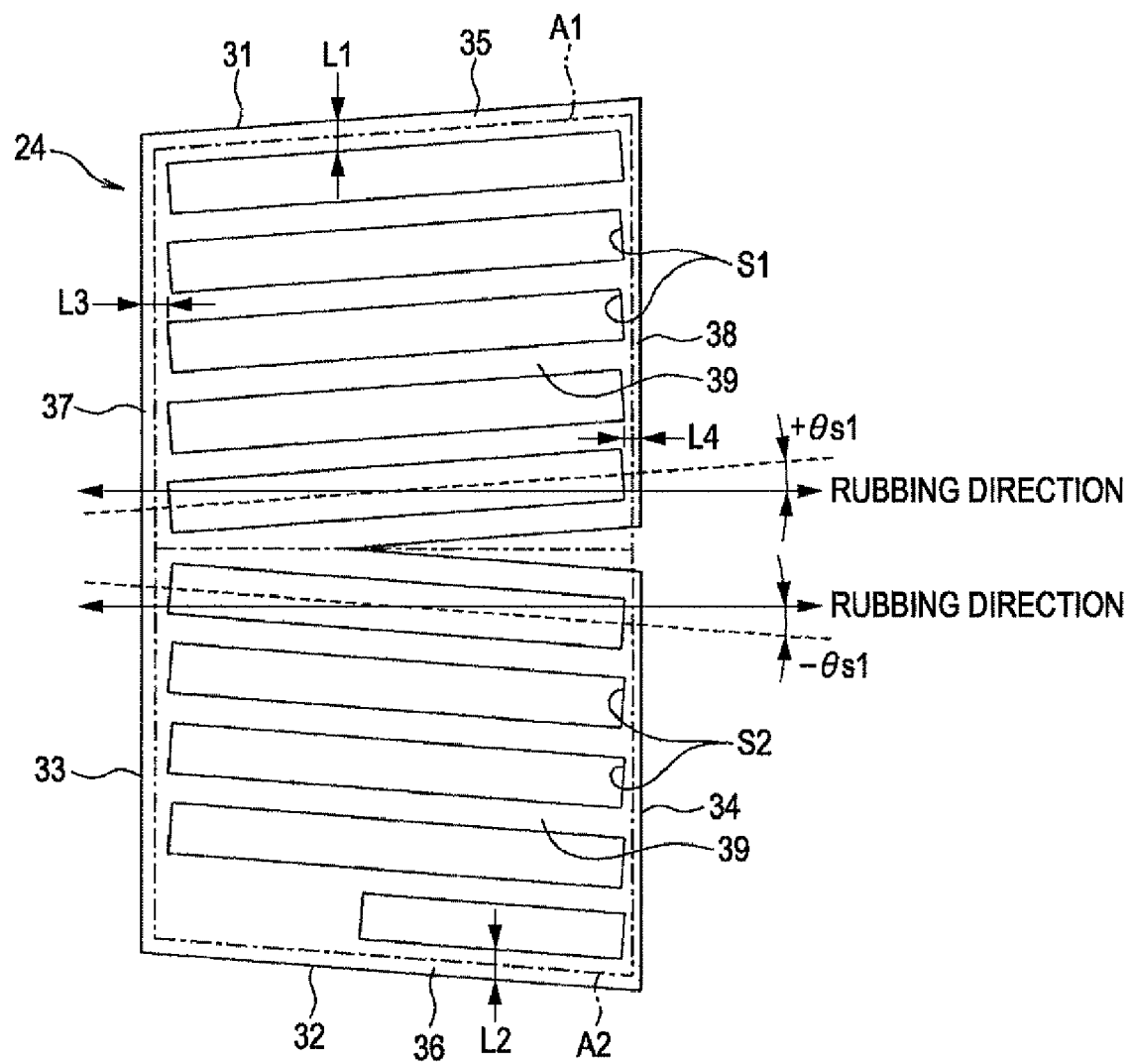
FIG. 14 is a top plan view of a pixel electrode shown in FIG. 12.

The rubbing direction of the alignment films 25 and 28 is identical to the horizontal direction (X direction), as illustrated in FIG. 14. As best shown in FIG. 14, each pixel electrode 24 has a so-called double slit configuration, in which a pair of first and second slit forming regions A1 and A2 each having a slit shape is provided so that they are vertically symmetric to each other about a central portion in the longitudinal direction of the pixel 3.

In the first slit forming region A1, a plurality of slits S1 is formed in parallel at predetermined intervals L1 in the vertical direction, each slit having a rectangular shape that is tilted by a predetermined angle $+\theta s1$ in the rubbing direction of the alignment films 25 and 28.

Moreover, in the second slit forming region A2, a plurality of slits S2 is formed in parallel at predetermined intervals L1 in the vertical direction, each slit having a rectangular shape that is tilted by a predetermined angle $-\theta s1$ in the rubbing direction of the alignment films 25 and 28.

Specifically, the first slit forming region A1 and the second slit forming region A2 are arranged such that an angle between the longitudinal direction of the pixel 3 and the longitudinal direction of the slits S1 and an angle between the longitudinal direction of the pixel 3 and the longitudinal direction of the slits S2 have a supplementary relationship.

Moreover, the pixel electrode 24 is formed such that an outer edge 31 close to the first slit forming region A1 is formed at a position separated by a predetermined distance L2 from the outermost slit S1 so as to serve as a shorter side that is in parallel to the slits S1, and an outer edge 32 close to the second slit forming region A2 is formed at a position separated by a predetermined distance L2 from the outermost slit S2 so as to serve as a shorter side that is in parallel to the slits S2.

Furthermore, the pixel electrode 24 is generally parallelogram shaped with outer edges 31 to 34, wherein opposite outer edges 33 and 34 serving as longer sides are formed so as to extend in the vertical direction along the drain line 5 to connect the left and right ends of the outer edges 31 and 32 with each other.

Here, the slits S1 and S2 of the first and second slit forming regions A1 and A2 are configured as apertures through which a voltage is applied between the pixel electrodes 24 as an upper electrode formed via the insulating film 23 and the common electrode 22 serving as a lower electrode, so that the liquid crystal molecules M are driven by an electric field generated by the voltage application. Since a plurality of slits S1 and S2 is formed in parallel to the vertical direction (Y direction) in each of the slit forming regions A1 and A2, it is possible to improve the transmittance of the slit forming regions A1 and A2.

Moreover, each slit S1 of the first slit forming region A1 has a tilt angle +θs1 in the range of about +5 degrees to about +15 degrees, for example, and preferably, of about +5 degrees, with respect to the rubbing direction of the alignment films 25 and 28, in order to prevent the rotation direction of the liquid crystal molecules M of the liquid crystal layer 26 from becoming unstable.

Furthermore, each slit S2 of the second slit forming region A2 has a tilt angle −θs1 in the range of about −5 degrees to about −15 degrees, for example, and preferably, of about −5 degrees, with respect to the rubbing direction of the alignment films 25 and 28, in order to prevent the rotation direction of the liquid crystal molecules M of the liquid crystal layer 26 from becoming unstable.

Furthermore, both ends in the longitudinal direction of each slit S1 or S2 are formed at positions separated inward from the opposite outer edges 33 and 34 of the pixel electrode 24 opposed to the respective ends by a predetermined distance L3. In this manner, each pixel electrode 24 has a configuration in which a parallelogram is formed by outer electrode portions 35 and 36 that form the opposite outer edges 31 and 32, respectively, and outer electrode portions 37 and 38 that form the opposite outer edges 33 and 34, respectively, and in which the outer electrode portions 37 and 38 are connected with each other by connection electrode portions 39 that form the slits S1 and S2.

In addition, the slits S1 and S2 at the boundary of the first slit forming region A1 and the second slit forming region A2 are formed such that the connection electrode portions 39 overlap with each other at the position of the outer electrode portion 37, and a slit S3 is formed close to the outer electrode portion 38 so that an end thereof is open to the outer edge 34.

When the slits S1 and S2 have a small tilt angle +θs1 and −θs1 with respect to the rubbing direction and a small slit width due to the limit of the resolution during a photolithographic process, the slit S3 has a shape wherein it is open to the outer edge 34, as illustrated in FIG. 14. On the other hand, when the slits S1 and S2 have a large tilt angle +θs1 and −θs1 and have a large slit width, the slit S3 may have a shape wherein the end close to the outer electrode portion 38 is closed by the outer electrode portion 38.

When the pixel electrodes 24 are patterned, in some cases, corner portions thereof are formed to have a slight roundness by a photolithographic process. In order to obviate such a roundness as much as possible, when the pattern of a mask used for the patterning is selected in consideration of an optical proximity effect, the roundness can be suppressed to an ignorable extent.

The thin film transistor TR described above is formed at the lower left corner of the second slit forming region A2 of the pixel electrode 24.

Moreover, as illustrated in FIG. 12, when the outer electrode portion 35 of the pixel electrode 24 and the drain line 5 are arranged such that at least portions thereof overlap with each other as viewed in plan view, the ends of the slits S1 can be formed closer to the drain line 5; therefore, it is possible to further improve the transmittance of the pixel 3. Furthermore, when the outer electrode portion 35 of the pixel electrode 24 and the gate line 4 are arranged such that they do not overlap with each other, the liquid crystal molecules M between the outer electrode portion 35 and the gate line 4 can be controlled by means of an electric field generated between the outer electrode portion 35 and the common electrode 22 serving as the lower electrode, which is formed larger than the pixel electrode 24; therefore, it is possible to further improve the transmittance of the pixel 3.

The operation of the liquid crystal display device 1 having such a configuration will be described with reference to FIG. 13. In an off state where an electric field is not generated between the common electrode 22 and the pixel electrode 24, the liquid crystal molecules M of the liquid crystal layer 26 are in an homogeneous alignment state, wherein the longer axis direction of the liquid crystal molecules is in parallel to the transmission axis of the first polarization plate 11, for example. In this case, light from the backlight 10 that is linearly polarized by the first polarization plate 11 passes through the liquid crystal layer 26 with a polarization axis unchanged and is then incident on the second polarization plate 30. However, since the polarization axis of the light is in parallel to the transmission axis of the second polarization plate 30, the light is absorbed by the second polarization plate 30. That is, images are displayed as black (a normally black display).

On the other hand, in an on state where an electric field is generated between the common electrode 22 and the pixel electrode 24, the longer axis of the liquid crystal molecules M of the liquid crystal layer 26 is rotated so as to be approximately in parallel to the first transparent substrate 12 in accordance with the electric field. In this case, light from the backlight 10 that is linearly polarized by the first polarization plate 11 is elliptically polarized as it suffers birefringence in the liquid crystal layer 26 and is then incident on the second polarization plate 30. Among the elliptically polarized light, a component of which a polarization axis is identical to the transmission axis of the second polarization plate 30 is emitted, so that images are displayed as white.

At this time, since the opposite outer edges 31 and 32 of the outer electrode portions 35 and 36 of the pixel electrode 24 are formed in parallel to the slits S1 and S2, compared with a case where the pixel electrode 24 is generally rectangular, the outer electrode portions 35 and 36 do not have any unnecessary margin; therefore, it is possible to improve the transmittance of the pixels 3.

In addition, since the thin film transistor TR has a double gate structure wherein the gate line 4 passes through the active layer 14 two times, it is possible to decrease the size of the regions where the thin film transistor is formed, and thus, the ratio of a displayable region, that is, an aperture ratio can be increased.

When the pixels 3 in which the pixel electrodes 24 are arranged are operated by a so-called line inversion driving method, display signals of different polarities are supplied to the respective pixel electrodes 24 of pixels 3 that are adjacent to each other in the vertical direction. For this reason, a desired display result is not obtained due to interference between different display signals, and thus, display defects may occur in the vicinity of boundaries of such pixels 3. In order to obviate such display defects, it would be good to separate the respective pixel electrodes 24 of the pixels 3 adjacent to each other in the vertical direction as much as possible; however, the transmittance may decrease when the separation distance is too large.

The distance between the opposite outer edge 31 of one pixel electrode 24 and the opposite outer edge 32 of the other pixel electrode 24 is preferably set to a value twice or slightly more than twice a distance where the liquid crystal molecules M disposed outside the opposite outer edges 31 and 32 of the pixel electrodes 24 can be rotated by a desired angle by an electric field. For example, the distance D1 between the outer edge 31 of one pixel electrode 24 of the respective adjustment pixel electrodes 24 and the outer edge 32 of the other pixel electrode 24 is in the range of 5 μm<D1<15 μm, and preferably, it is in the range of 7 μm<D1<10 μm for best results.

Figure 15:
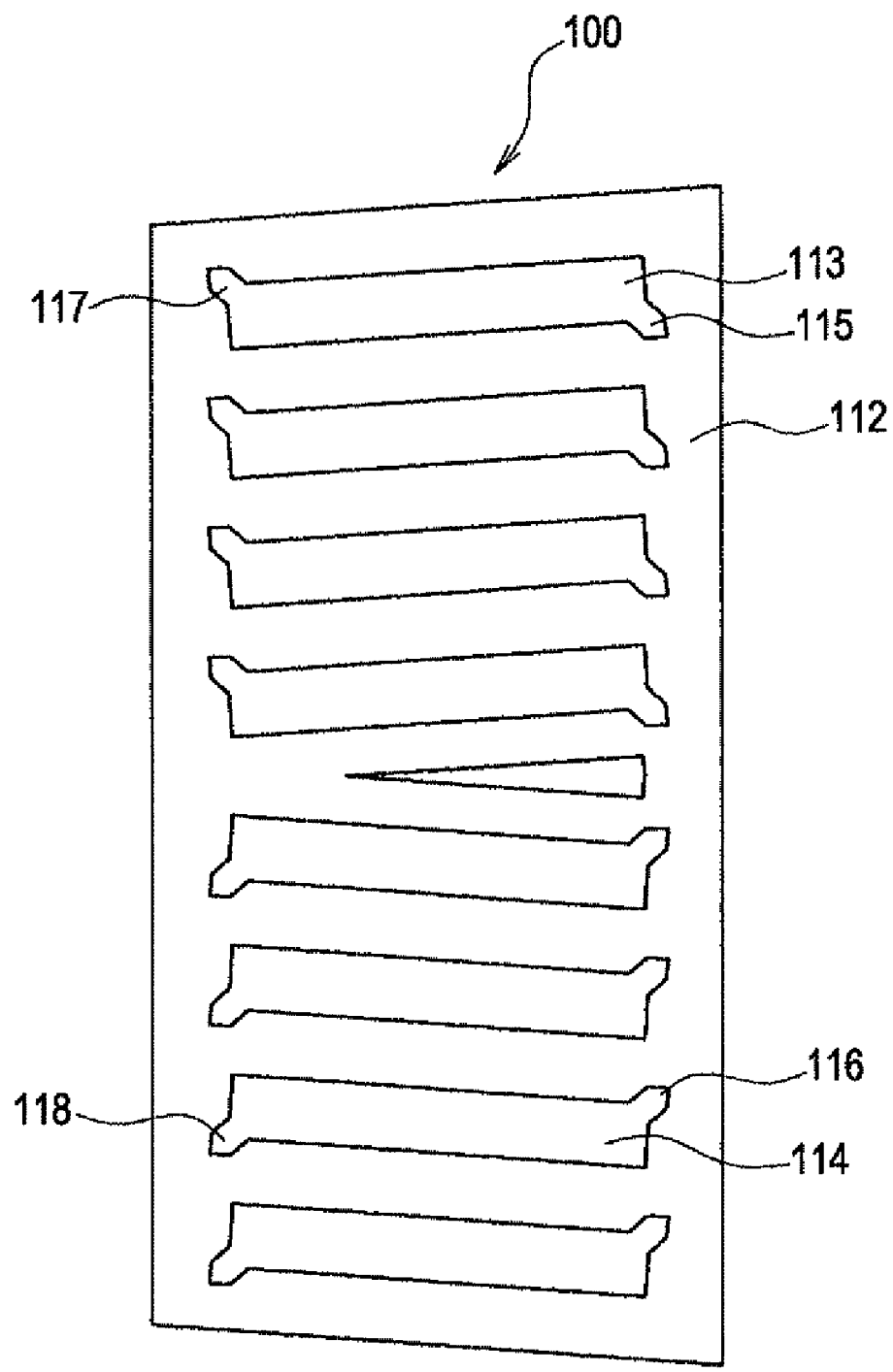
FIG. 15 is a top plan view of an aperture forming mask according to the fourth embodiment.

In the fourth embodiment, when the ends of the slits S1 and S2 have a roundness, in some regions, the rotation direction of the liquid crystal molecules M may be inverted with respect to a desired direction, with the result that there occurs a disclination, which is a phenomenon that in regions where images are to be displayed as white, images are displayed as black, and thus the transmittance decreases. In order to suppress the occurrence of the disclination, it is necessary to obviate the roundness of the ends of the slits S1 and 52, and for this reason, an aperture electrode forming mask 100 as illustrated in FIG. 15 is used as a mask used for a photolithographic process.

The aperture electrode forming mask 100 is configured in a manner similar to the mask illustrated in FIG. 4 according to the first embodiment such that basic transmission pattern portions 113 having a shape corresponding to the shape of the slits S1 are formed at positions opposite the first slit forming region A1 of the pixel electrode 24, basic transmission pattern portions 114 having a shape corresponding to the shape of the slits S2 are formed at positions opposite the second slit forming region A2 of the pixel electrode 24, and correction transmission pattern portions 115, 116, 117 and 118 are formed to suppress the occurrence of the disclination.

Here, in the case of the present embodiment, since the slits S1 of the first slit forming region A1 are tilted in the positive direction, i.e., a counter-clockwise direction, with respect to the rubbing direction, considering an XY coordinate system in which an origin is at the central point of each slit S1, the X axis corresponds to the longitudinal direction of the slit, and the Y axis corresponds to the width direction of the slit, the portions of the basic transmission pattern portion 113 correspond to corner portions of each slit in the second and fourth quadrants of the XY coordinate system. Meanwhile, since the slits S2 of the second slit forming region A2 are tilted in the negative direction, i.e., a clockwise direction, with respect to the rubbing direction, the portions of the basic transmission pattern portion 114 where the disclination occurs correspond to corner portions E of each slit in the first and third quadrants of the XY coordinate system.

The correction transmission pattern portions have the same configuration as the correction transmission pattern portion illustrated in FIG. 5 according to the first embodiment, and detailed dimension settings can be applied in a similar manner.

When exposure is performed using the aperture electrode forming mask 100 having such a configuration, light passes through the basic transmission pattern portions 113 and 114 and the correction transmission pattern portions 115 to 118, whereby a photosensitive resist is exposed. When the photosensitive resist is exposed, characteristics thereof are changed, and the exposed portions can be removed by using appropriate development solution, whereby apertures having the same shape as that of the basic transmission pattern portions 113 and 114 are formed on the photosensitive resist. In this way, when etching is performed on a transparent conductive material film for pixel electrodes using the photosensitive resist having the apertures formed therein, the pixel electrode 24 having the slits S1 and S2 having a shape corresponding to the apertures of the photosensitive resist is obtained.

Fifth Embodiment

Next, a fifth embodiment of the invention will be described with reference to FIGS. 16 and 17.

In the fifth embodiment, thin film transistors TR are formed at boundaries of a first slit forming region A1 and a second slit forming region A2.

Figure 16:
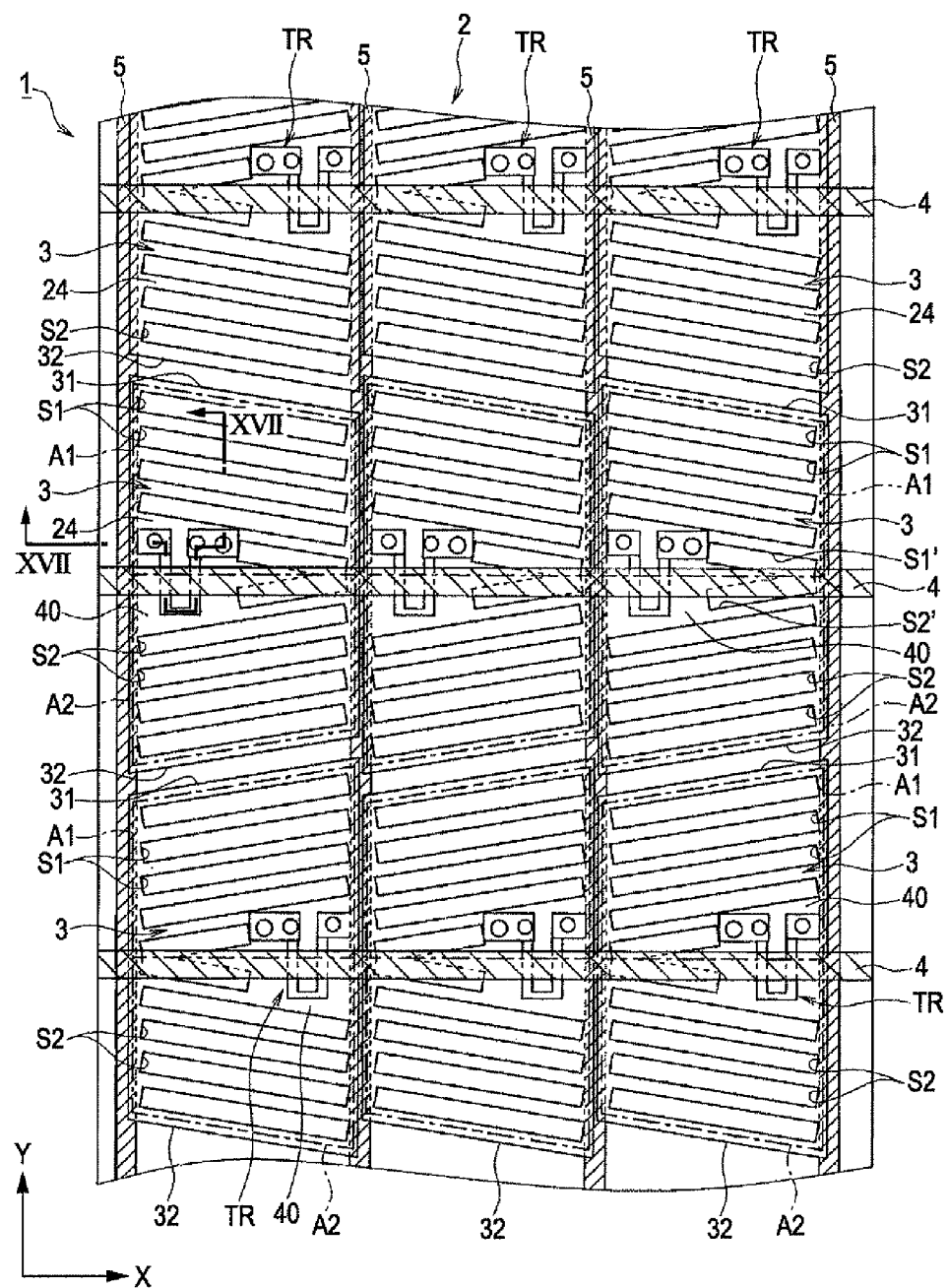
FIG. 16 is a top plan view of a liquid crystal display device according to a fifth embodiment of the present invention.

Specifically, as illustrated in FIG. 16, the fifth embodiment has the same configuration as that of the fourth embodiment illustrated in FIG. 1, except that a thin film transistor TR is formed at a boundary of the first slit forming region A1 and the second slit forming region A2 of each of the pixel electrodes 24 within the pixels 3, and the orientations of the pixel electrodes 24 and the pixels 3 that are adjacent to each other in the vertical direction, i.e., along the drain line 5, are inverted in the horizontal direction. The same constituent elements as those of FIG. 1 will be referenced by the same reference numerals, and the detailed descriptions thereof will be omitted.

In the fifth embodiment, an absolute value of the tilt angle +θs1 and −θs1 of the slits S1 and S2 of the first slit forming region A1 and the second slit forming region A2 is set to a value larger than that of the fourth embodiment.

Figure 18:
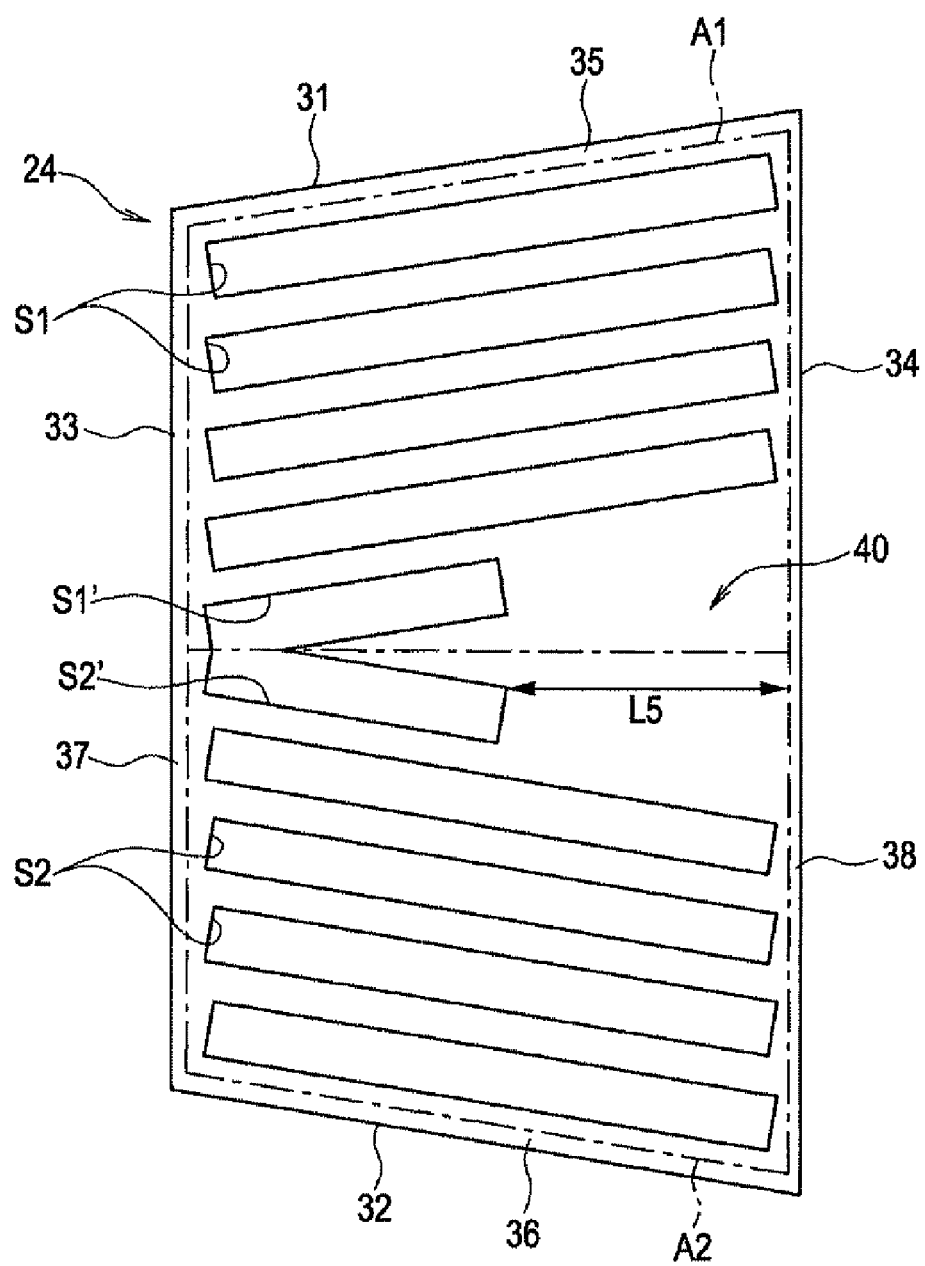
FIG. 18 is a top plan view of a pixel electrode shown in FIG. 16.

As illustrated in an enlarged view in FIG. 18, slits S1' and S2' formed at the boundary of the first slit forming region A1 and the second slit forming region A2 are connected with each other at the side of the outer electrode portion 37 to form a V shape. Moreover, the ends of the slits S1' and S2' close to the outer electrode portion 38 are closed at positions separated from the outer electrode portion 38 by a distance L5 that is larger than the distance L2, thereby forming a transistor opposing electrode portion 40.

Figure 17:
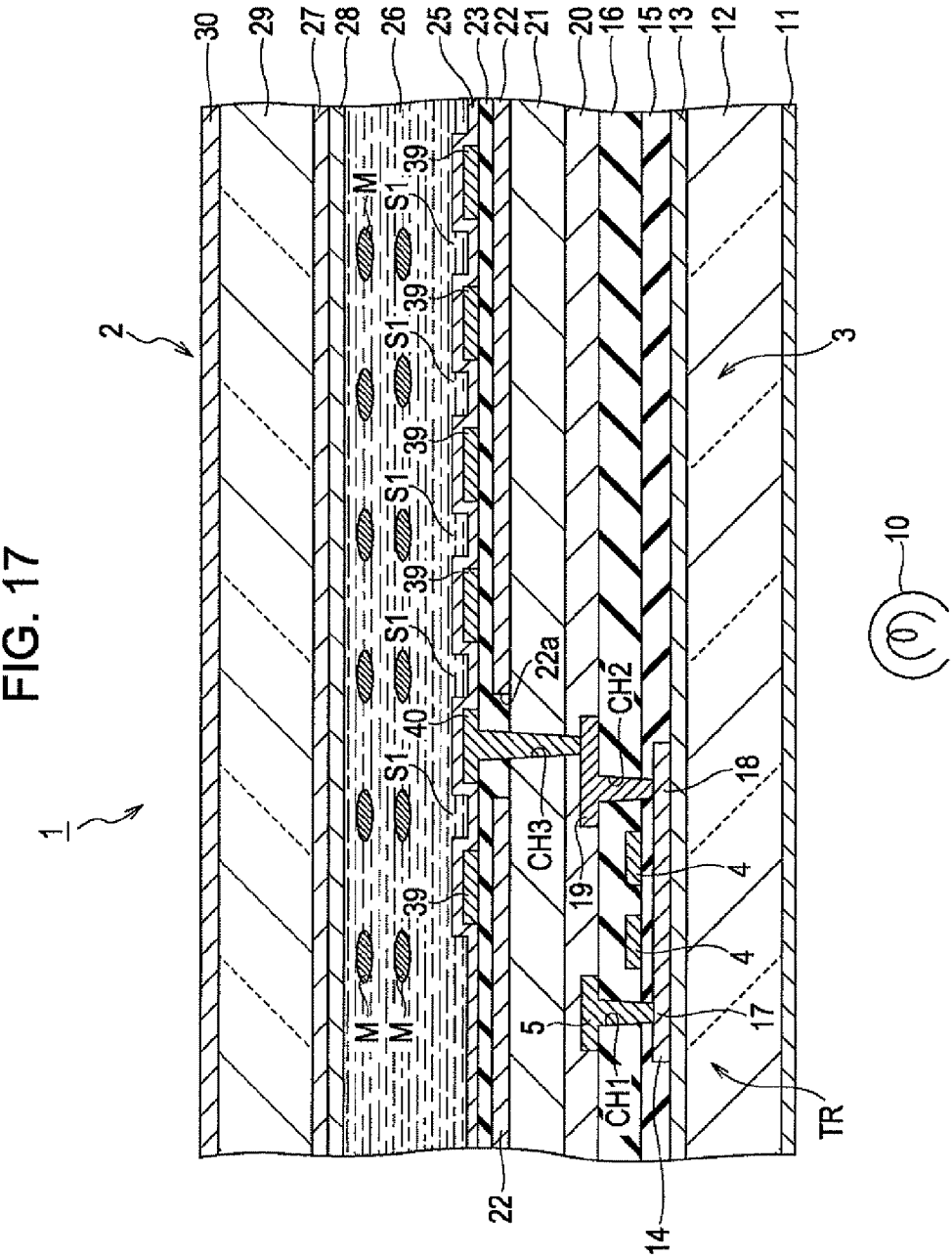
FIG. 17 is a sectional view taken along the line XVII-XVII in FIG. 16.

Moreover, as illustrated in FIG. 17, an active layer 14 having a generally U shape as viewed in FIG. 16 is formed below the transistor opposing electrode portion 40 in an opposing manner, and a thin film transistor TR having a double gate structure is formed such that a gate line 4 passes between the drain 17 and the source 18 of the active layer 14 two times. The source 18 of the thin film transistor TR is electrically connected to the transistor opposing electrode portion 40 via the contact hole CH2, the source electrode 19, and the contact hole CH3.

According to the fifth embodiment, the transistor opposing electrode portion 40 that is opposed to the thin film transistor TR is formed at the boundary of the first slit forming region A1 and the second slit forming region A2 in which the tilt directions of the slits S1 and S2 are opposite. Moreover, as illustrated in FIG. 17, the transistor opposing electrode portion 40 is connected to the source 18 of the thin film transistor TR, and the gate line 4 is disposed so as to cross the active layer 14 of the thin film transistor TR two times. Therefore, as illustrated in FIG. 16, the gate line 4 can be disposed so as to cross a central portion in the vertical direction of one pixel 3, and thus, the size of the pixel 3 can be minimized.

In addition, as described above, since the thin film transistor TR has a double gate structure, it is possible to miniaturize the configuration, and thus, the gap between the first slit forming region A1 and the second slit forming region A2 can be narrowed, whereby the size of the pixel 3 can be further minimized.

Furthermore, since the adjacent pixel electrodes 24 are horizontally inverted, the slits S1 or S2 are continuously in parallel to each other between the adjacent pixels 3, and thus, no discontinuity is formed between the pixels 3, whereby the transmittance between the adjacent pixels 3 can be improved.

Sixth Embodiment

Next, a sixth embodiment of the invention will be described with reference to FIGS. 19 and 20.

In the sixth embodiment, a pixel electrode has a comb-teeth shape.

Figure 19:
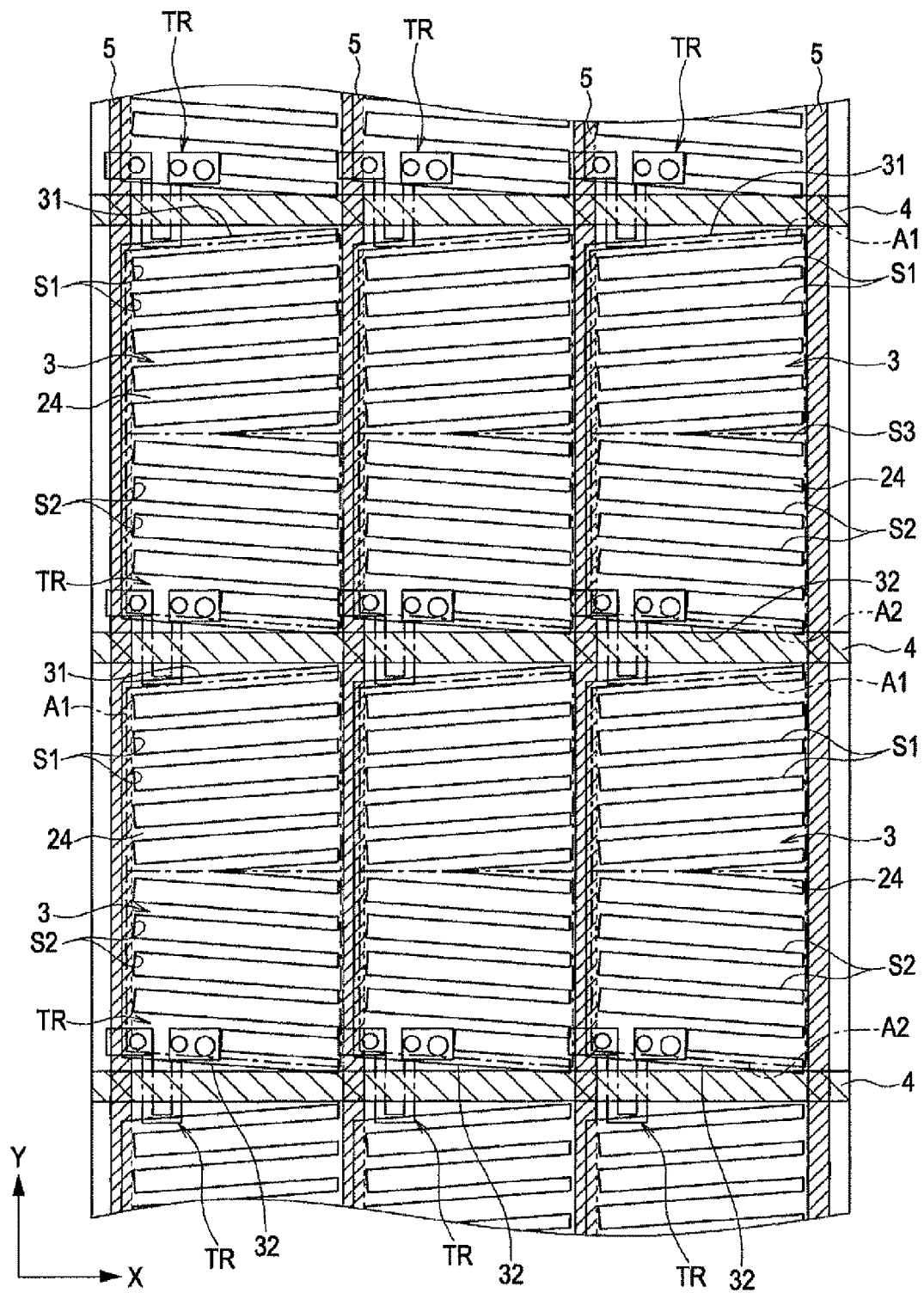
FIG. 19 is a top plan view of a liquid crystal display device according to a sixth embodiment of the present invention.
Figure 20:
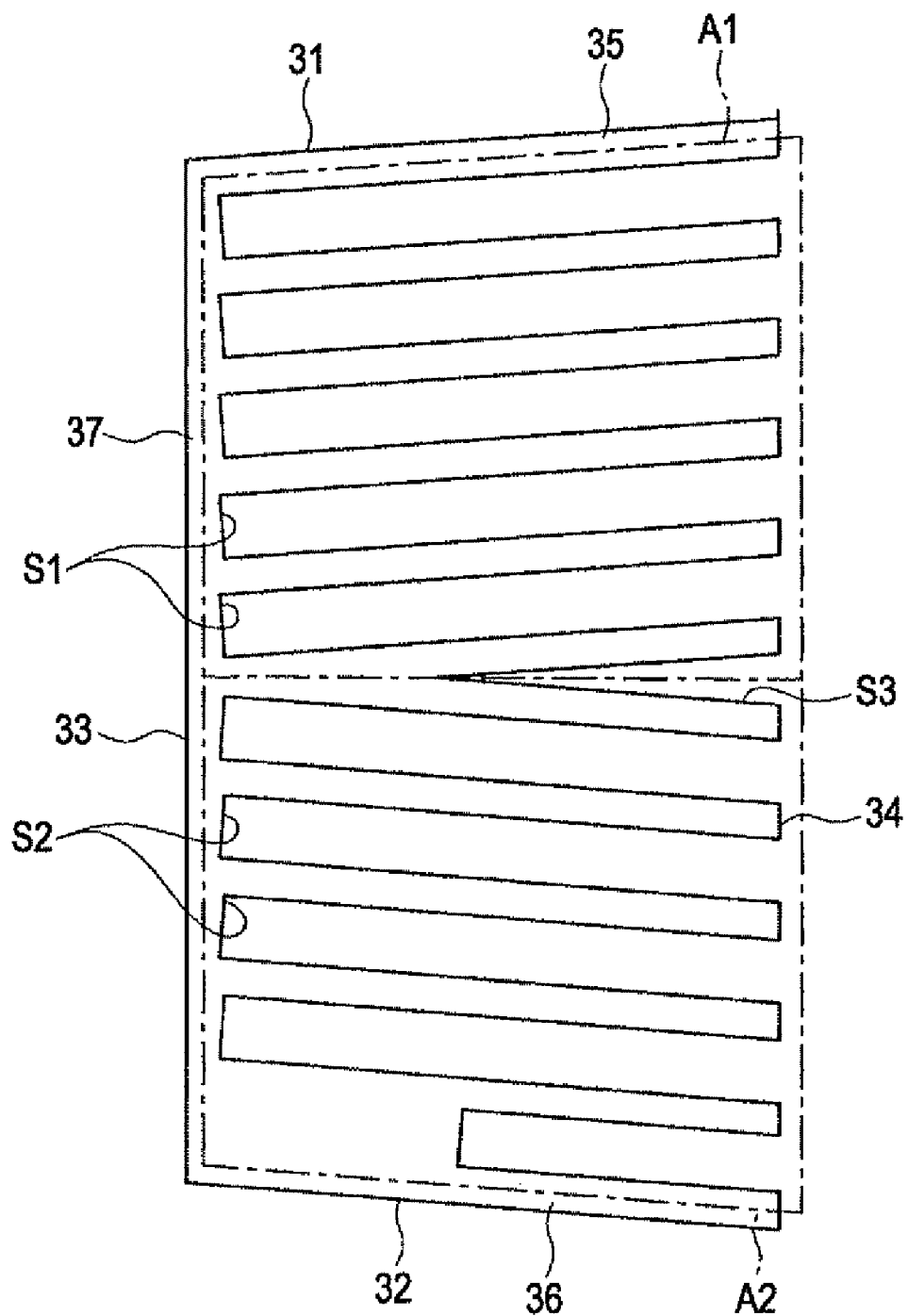
FIG. 20 is a top plan view of a pixel electrode shown in FIG. 19.

Specifically, as illustrated in FIGS. 19 and 20, the sixth embodiment has the same configuration as that of the fourth embodiment illustrated in FIGS. 12 and 14, except that the outer electrode portion 38 on the right side of the pixel electrode 24 according to the fourth embodiment is not formed, and the pixel electrode 24 has a comb-teeth shape. The same constituent elements as those of FIGS. 12 and 14 will be referenced by the same reference numerals, and the detailed descriptions thereof will be omitted.

According to the sixth embodiment, since the outer electrode portion 38 of the pixel electrode 24 according to the fourth embodiment is not formed and the pixel electrode 24 has a comb-teeth shape, the slits S1 do not have ends at one sides thereof, and thus, it is possible to improve the transmittance.

Figure 21:
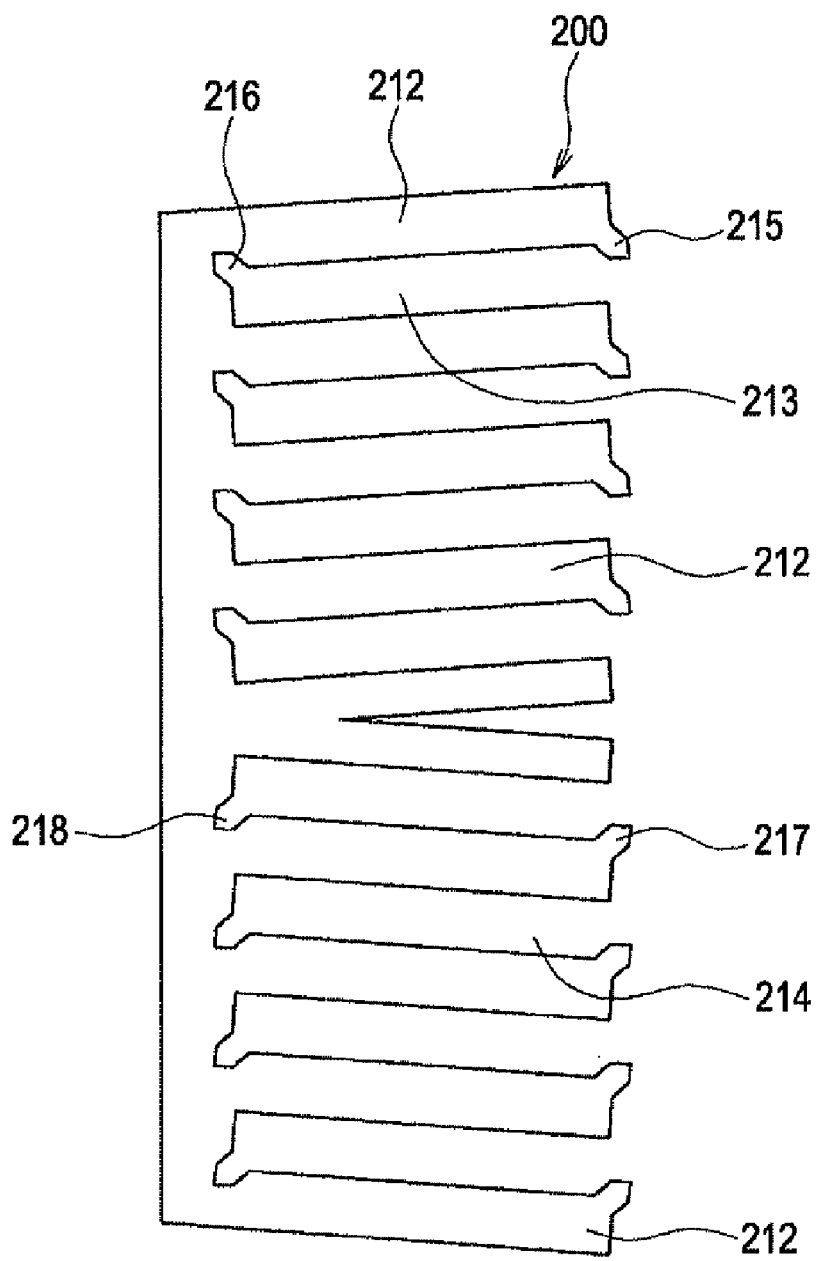
FIG. 21 is a top plan view of an aperture forming mask according to the sixth embodiment.

In the sixth embodiment, in order to prevent the occurrence of the disclination, it is necessary to obviate a roundness of the ends of the comb-teeth shaped pixel electrode 24. For this reason, an aperture electrode forming mask 200 as illustrated in FIG. 21 is used as a mask used for a photolithographic process.

The aperture electrode forming mask 200 is configured in a manner similar to the mask illustrated in FIG. 15 according to the fourth embodiment such that basic transmission pattern portions 213 and 214 having a shape corresponding to the shape of the slits S1 and S2 are formed at positions opposite the slits S1 and S2 of the pixel electrode 24, correction non-transmission pattern portions 215 and 216 are formed to suppress the occurrence of the disclination, and correction transmission pattern portions 217 and 218 are formed, so that the basic transmission pattern portions 213 and 214 are expanded to suppress the occurrence of the disclination.

Here, similar to the case of the fourth embodiment where the slits S1 are tilted in the positive direction, i.e., a counter-clockwise direction, with respect to the rubbing direction, considering an XY coordinate system in which an origin is at the central point of each slit S1, the x axis corresponds to the longitudinal direction of the slit, and the Y axis corresponds to the width direction of the slit, the portions of the basic transmission pattern portion 213 correspond to corner portions of each slit in the second and fourth quadrants of the XY coordinate system. Meanwhile, when like the slits S2, the slits are tilted in the negative direction, i.e., a clockwise direction, with respect to the rubbing direction, the portions of the basic transmission pattern portion 214 where the disclination occurs correspond to corner portions of each slit in the first and third quadrants of the XY coordinate system.

The correction non-transmission pattern portions have the same configuration as the correction transmission pattern portion illustrated in FIG. 10 according to the third embodiment, and detailed dimension settings can be applied in a similar manner.

In the sixth embodiment, the pixel electrode 24 according to the fourth embodiment is configured to have a comb-teeth shape; however, the present invention is not limited to this, and the pixel electrode according to the fifth embodiment may be configured to have a comb-teeth shape.

Moreover, in the first to third embodiments, it has been described for the case where the longitudinal direction of the slits S1 of the pixel electrode 24 is tilted in the positive direction with respect to the rubbing direction; however, the present invention is not limited to this, but the longitudinal direction of the slits S1 may be tilted in the negative direction with respect to the rubbing direction.

Furthermore, in the first to third embodiments, it has been described for the case where among the common electrode 22 and the pixel electrode 24, the pixel electrode 24 is disposed closer to the liquid crystal molecules M than the common electrode 22; however, the present invention is not limited to this, but the common electrode 22 may be disposed close to the liquid crystal molecules M, and in this case, the slits S1 may be formed in the common electrode 22 instead of the pixel electrode 24.

In addition, in the fourth to sixth embodiments, it has been described for the case where among the common electrode 22 and the pixel electrode 24, the pixel electrode 24 is disposed closer to the liquid crystal molecules M than the common electrode 22 and where the first slit forming region A1 and the second slit forming region A2 having the slits S1 and S2, respectively, are formed in the pixel electrode 24; however, the present invention is not limited to this, but the common electrode 22 may be disposed close to the liquid crystal molecules M, and in this case, the first slit forming region A1 and the second slit forming region A2 having the slits S1 and S2, respectively, may be formed in the common electrode 22 instead of the pixel electrode 24.

Figure 11:
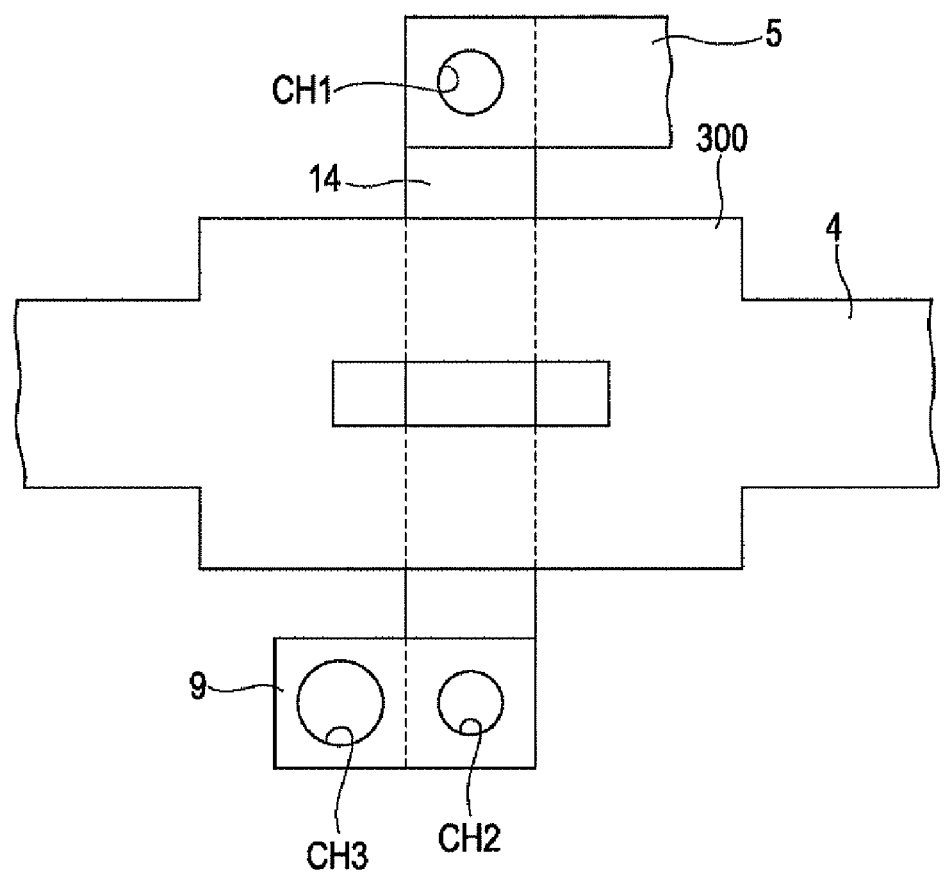
FIG. 11 is a top plan view of another configuration of a thin film transistor.

Moreover, in the first to sixth embodiments, it has been described for the case where the active layer 14 of the thin film transistor TR has a generally U shape, and where the gate line 4 is disposed so as to pass through the active layer 14 two times, so that a double gate structure is formed. However, the present invention is not limited to this, but as illustrated in FIG. 11, the active layer 14 may be formed in a linear shape, a branch portion 300 may be formed in the gate line 4 so as to bifurcated at the position of the active layer 14, so that a double gate structure wherein the gate line 4 crosses the active layer 14 two times is formed.

Furthermore, in the first to sixth embodiments, it has been described for the case where the pixel 3 is operated in an FFS mode of a normally black type; however, the present invention is not limited to this but may be applied to a liquid crystal display device that is operated in an FFS mode of a normally white type. In such a case, the relationship between the transmission axis of the first polarization plate 11 and the second polarization plate 30 and the rubbing direction of the alignment films 25 and 28 may be changed in accordance with the normally white type.

Although the exemplary embodiments of the invention have been described with reference to the accompanying drawings, it should be understood that the invention is not limited to such embodiments. Various shapes or combinations of respective constituent elements illustrated in the above-described embodiments are merely examples, and various changes may be made depending on design requirements or the like without departing from the spirit or scope of the invention.

What is claimed is:

1. A liquid crystal display device, comprising:
a plurality of pixels that forms a display unit,
wherein each pixel comprises at least:
a pair of substrates that is arranged opposite each other with a liquid crystal layer disposed therebetween; and
a common electrode and a pixel electrode that are disposed on one substrate of the pair of substrates with an insulating film disposed therebetween so as to drive liquid crystal molecules of the liquid crystal layer, and wherein one of the common electrode and the pixel electrode is an electrode closer to the liquid crystal layer, wherein the electrode closer to the liquid crystal layer has a slit having a predetermined tilt angle with respect to a longitudinal direction of each of the pixels and two opposite outer edges that are in parallel to the slit, wherein the electrode closer to the liquid crystal layer has four straight outer edges, including the two opposite outer edges, forming a parallelogram shape, and wherein an entire electrode periphery is formed by the four straight outer edges.

2. The liquid crystal display device according to claim 1, wherein the slit has a parallelogram shape and is formed at a position inner than opposite outer edges in a longitudinal direction of the slit, of the electrode closer to the liquid crystal layer.

3. The liquid crystal display device according to claim 1, wherein a plurality of slits is formed in parallel to each other in the electrode closer to the liquid crystal layer.

4. The liquid crystal display device according to claim 1, wherein the electrode closer to the liquid crystal layer is formed such that an outer electrode portion thereof does not overlap with a gate line.

5. The liquid crystal display device according to claim 1, wherein the electrode closer to the liquid crystal layer is formed such that at least a portion of an outer electrode portion thereof overlaps with a drain line.

6. The liquid crystal display device according to claim 1, wherein the slit formed in the electrode closer to the liquid crystal layer is formed at a predetermined tilt angle with respect to a rubbing direction.

7. The liquid crystal display device according to claim 1, wherein the slit is formed using a mask in which an extension slit portion is formed at a portion of the slit close to an aperture where a disclination occurs.

* * * * *